US008013845B2

(12) United States Patent
Ostergaard et al.

(10) Patent No.: US 8,013,845 B2
(45) Date of Patent: Sep. 6, 2011

(54) OPTICAL TOUCH PAD WITH MULTILAYER WAVEGUIDE

(75) Inventors: Jens Wagenblast Stubbe Ostergaard, Lejre (DK); Jonas Ove Philip Eliasson, Valby (DK); Jens Bastue, Virum (DK)

(73) Assignee: FlatFrog Laboratories AB, Lund (SE)

( * ) Notice: Subject to any disclaimer, the term of this patent is extended or adjusted under 35 U.S.C. 154(b) by 1571 days.

(21) Appl. No.: 11/320,742

(22) Filed: Dec. 30, 2005

(65) Prior Publication Data

US 2007/0152985 A1  Jul. 5, 2007

(51) Int. Cl.
*G06F 3/042* (2006.01)

(52) U.S. Cl. ...... 345/176; 345/173; 345/175; 178/18.09

(58) Field of Classification Search ............ 345/173, 345/175, 176; 178/18.09
See application file for complete search history.

(56) References Cited

U.S. PATENT DOCUMENTS

| | | | | |
|---|---|---|---|---|
| 4,180,702 A | 12/1979 | Sick et al. | | 250/227.11 |
| 4,346,376 A | 8/1982 | Mallos | | 340/712 |
| 4,484,179 A * | 11/1984 | Kasday | | 345/176 |
| 4,542,375 A | 9/1985 | Alles et al. | | 340/712 |
| 5,600,105 A | 2/1997 | Fukuzaki et al. | | 178/19 |
| 5,672,852 A | 9/1997 | Fukuzaki et al. | | 178/19 |
| 5,686,942 A | 11/1997 | Ball | | 345/158 |
| 5,729,249 A | 3/1998 | Yasutake | | 345/173 |
| 5,945,980 A | 8/1999 | Moissev et al. | | 345/173 |
| 6,061,177 A | 5/2000 | Fujimoto | | 359/443 |
| 6,227,667 B1 | 5/2001 | Halldorsson et al. | | 351/206 |
| 6,380,732 B1 | 4/2002 | Gilboa | | 324/207.17 |
| 6,390,370 B1 | 5/2002 | Plesko | | 235/462.49 |
| 6,660,964 B1 | 12/2003 | Benderly | | 219/121.74 |
| 6,799,141 B1 | 9/2004 | Stoustrup et al. | | 702/159 |
| 7,133,031 B2 | 11/2006 | Wang et al. | | 345/173 |
| 7,442,914 B2 | 10/2008 | Eliasson et al. | | 250/221 |
| 7,465,914 B2 | 12/2008 | Eliasson et al. | | 250/221 |
| 7,847,789 B2 | 12/2010 | Kolmykov-Zotov et al. | | 345/173 |
| 2002/0158823 A1 | 10/2002 | Zavracky et al. | | 345/87 |
| 2002/0158853 A1 | 10/2002 | Sugawara et al. | | 345/176 |
| 2003/0137494 A1 | 7/2003 | Tulbert | | 345/173 |
| 2003/0156100 A1 | 8/2003 | Gettemy | | 345/204 |

(Continued)

FOREIGN PATENT DOCUMENTS

DE  10139147 A1  3/2003

(Continued)

OTHER PUBLICATIONS

Iizuka, Keigo, *Elements of Photonics, vol. I: In Free Space and Special Media*, Jun. 15, 2002, John Wiley & Sons, Inc., Chapter 2, pp. 110-165.

*Primary Examiner* — Amare Mengistu
*Assistant Examiner* — Koosha Sharifi
(74) *Attorney, Agent, or Firm* — Pillsbury Winthrop Shaw Pittman LLP

(57) ABSTRACT

An optical touch pad that includes a multilayer waveguide optically coupled to at least one electromagnetic radiation detector. Based on electromagnetic radiation directed from an object to the detector by the multilayer waveguide, information related to an object proximate to (e.g., hovering above) and/or in contact with the optical touch pad may be determined. For example, the information related to the object may include position information, object-type information, and/or other information related to the object.

128 Claims, 11 Drawing Sheets

U.S. PATENT DOCUMENTS

| | | | |
|---|---|---|---|
| 2003/0214486 A1 | 11/2003 | Roberts | 345/173 |
| 2004/0027339 A1* | 2/2004 | Schulz | 345/173 |
| 2004/0032401 A1* | 2/2004 | Nakazawa et al. | 345/173 |
| 2004/0238627 A1 | 12/2004 | Silverbrook et al. | 235/382 |
| 2004/0239702 A1 | 12/2004 | Kang et al. | 345/863 |
| 2004/0252091 A1 | 12/2004 | Ma et al. | 345/87 |
| 2004/0252867 A1 | 12/2004 | Lan et al. | 382/124 |
| 2005/0156914 A1 | 7/2005 | Lipman et al. | 345/179 |
| 2005/0212774 A1 | 9/2005 | Ho et al. | 345/173 |
| 2005/0248540 A1* | 11/2005 | Newton | 345/173 |
| 2005/0253834 A1 | 11/2005 | Sakamaki et al. | 345/207 |
| 2006/0001653 A1 | 1/2006 | Smits | 345/176 |
| 2006/0017706 A1* | 1/2006 | Cutherell et al. | 345/173 |
| 2006/0033725 A1 | 2/2006 | Marggraff et al. | 345/179 |
| 2006/0256092 A1 | 11/2006 | Lee | 345/173 |
| 2006/0279558 A1* | 12/2006 | Van Delden et al. | 345/176 |
| 2006/0281543 A1 | 12/2006 | Sutton et al. | 463/29 |
| 2006/0290684 A1 | 12/2006 | Giraldo et al. | 345/175 |
| 2007/0052684 A1 | 3/2007 | Gruhlke et al. | 345/173 |
| 2007/0125937 A1 | 6/2007 | Eliasson et al. | 250/221 |
| 2007/0152985 A1 | 7/2007 | Ostergaard et al. | 345/176 |
| 2009/0135162 A1 | 5/2009 | Van De Wijdeven et al. | 345/175 |

FOREIGN PATENT DOCUMENTS

| | | |
|---|---|---|
| EP | 1 457 870 | 9/2004 |
| GB | 2 409 515 | 6/2005 |
| WO | WO 84/03186 | 8/1984 |
| WO | WO 2004/081502 | 9/2004 |
| WO | WO 2004/081956 | 9/2004 |
| WO | WO 2005/026938 | 3/2005 |
| WO | WO 2005/029172 | 3/2005 |
| WO | WO 2005/029395 | 3/2005 |
| WO | WO 2005/125011 | 12/2005 |
| WO | WO 2006/124551 | 11/2006 |

\* cited by examiner

OPTICAL TOUCH PAD WITH MULTILAYER WAVEGUIDE

FIELD OF THE INVENTION

The invention relates to optical touch pads that use total internal reflection to direct electromagnetic radiation returned to an optical touch pad from an object to determine positional information, and/or other information related to the object.

BACKGROUND OF THE INVENTION

Touch pad systems that enable a user to input information to a processor by moving an object relative to a touch pad surface are known. Typically, touch pads may be implemented in computing applications such as PDA's and computers, and may also be found in electronic displays in a wide variety of applications such as teller machines, gaming machines, automotive navigation systems, restaurant management systems, grocery store checkout lines, gas pumps, information kiosks, and hand-held data organizers, to name a few.

However, conventional touch pad systems may be bulky, and may increase an overall size of a device to which it may be attached. Additionally, conventional touch pads may not provide adequate ruggedness to endure standard use conditions in some devices, such as personal mobile devices like radio telephones, PDA's, and/or other personal mobile devices. For example, mobile devices may experience chemical exposure, moisture, mechanical stress such as shock impacts, and/or other stresses or exposures.

In general, the addition of a typical touch pad to a conventional flat panel display, and/or other conventional displays, may also result in degradation of display performance. For example, power consumption, resolution, contrast, view angle, colour gamut, grey scale, and/or brightness of a conventional display may be degraded by the addition of a typical touch pad.

For example, these and other drawbacks may be associated with optical touch pads that implement light emitting styluses, optical touch pads that implement frustrated internal resistance supplied to the optical touch pad by a dedicated light source, optical touch pads that implement coordination with the rasterization of a CRT display to determine positional information related to an object, and optical touch pads that utilize an imaging device that images the surface of the optical touch pad.

Thus, there remains a need for a touch pad that addresses these and other drawbacks associated with conventional touch pad systems.

SUMMARY

One aspect of the invention relates to addressing these and other drawbacks associated with conventional touch pad systems.

Another aspect of the invention relates to an optical touch pad that includes a multilayer waveguide optically coupled to at least one electromagnetic radiation detector. Based on electromagnetic radiation directed from an object to the detector by the multilayer waveguide, information related to an object proximate to (e.g., hovering above) and/or in contact with the optical touch pad may be determined. For example, the information related to the object may include position information, object-type information, and/or other information related to the object.

The multilayer waveguide may include a plurality of waveguide layers with different indexes of refraction, and may direct electromagnetic radiation to the at least one detector by total internal reflection within one or more of the waveguide layers. The multilayer waveguide layer may direct electromagnetic radiation from an object proximate to or in contact with a surface of the optical touch pad.

The plurality of waveguide layers may include two or more layers having progressively lower refractive indices towards a border between two refractive indices that form a total internal reflection mirror that confines the optical touch pad from optical interference caused by the display and/or other surfaces beneath the optical touch pad. In some instances, at least one or more of the indices of refraction may be selected to significantly reduce optical noise within the multilayer waveguide caused by surface contaminants.

According to various implementations of the invention, when an object is proximate to and/or in contact with the optical touch pad, the object may be illuminated by electromagnetic radiation emanating from the display beneath the optical touch pad or emitted transverse by emitters attached to the waveguide. The object may absorb, reflect, scatter, and/or otherwise interact with the electromagnetic radiation according to its own optical characteristics and its position with respect to the optical touch pad. Based on the interaction of the object with the electromagnetic radiation, a portion of the electromagnetic radiation may be returned to the optical touch pad. The electromagnetic radiation returned to the optical touch pad by the object may be guided by total internal reflection within the multilayer waveguide to the at least one detector.

In some implementations, the indices of refraction of the waveguide layers within the multilayer waveguide may be selected so that the electromagnetic radiation may be directed to the at least one detector with one or more properties indicative of information related to the object. For example, the bounce angle, the intensity, and/or other properties of the electromagnetic radiation may be indicative of information related to the object. Based on the detection of the electromagnetic radiation by the at least one detector, information related to the object may be determined. The information related to the object may include position information, object-type information, and/or other information.

According to some implementations, the multilayer waveguide may include a first waveguide layer having a first index of refraction, and a second waveguide layer having a second index of refraction. The first and second indices of refraction may be selected such that a first total internal reflection mirror ("TIR mirror") may be formed on a surface of the first waveguide layer opposite the second waveguide layer, a second TIR mirror may be formed between the first waveguide layer and the second waveguide layer, and a third TIR mirror may be formed on a surface of the second waveguide layer opposite the first waveguide layer.

Based on the index of refraction of an object proximate to or in contact with the optical touch pad, electromagnetic radiation returned to optical touch pad by the object may be introduced into the multilayer waveguide at difference angles of incidence to the second TIR mirror. For example, in instances in which the refractive index of the object is relatively higher (e.g., a stylus), the largest angle of incidence of the electromagnetic radiation on the second TIR mirror may be relatively larger. In instances in which the refractive index of the object is relatively lower (e.g., human tissue), the largest angle of incidence of the electromagnetic radiation on the second TIR mirror may be relatively smaller.

The first and second layers refractive indices may be selected such that if the object is of a first object-type the electromagnetic radiation returned by the object may include electromagnetic radiation that will be reflected at the second TIR mirror, while if the object is of a second object-type substantially all of electromagnetic radiation returned by the object will be pass through the second TIR mirror. The electromagnetic radiation reflected at the second TIR mirror may be confined within the first waveguide layer, and be directed to the at least one detector by the first and second TIR mirror. The electromagnetic radiation that passes through the second TIR mirror may be totally internally reflected at the third TIR mirror, and be directed to the at least one detector by the first and third TIR mirrors. By determining whether the electromagnetic radiation directed to the at least one detector includes electromagnetic radiation guided to the at least one detector by the first and second TIR mirrors, an object of a relatively higher refractive type may be determined from an object of a relatively lower refractive type.

In some implementations, the optical touch pad may include an auxiliary waveguide layer. The auxiliary waveguide layer may include an underlayer bounded by boundary layers. The underlayer may have a higher index of refraction than the boundary layers and, in some instances, may be formed from a relatively pliable material. A plurality of deflecting structures may be formed at the surfaces of the underlayer. For example, the deflecting structures may including microstructures, nano structures, and/or gratings. The deflecting structures may be formed to deflect electromagnetic radiation upwards out of the underlayer. The electromagnetic radiation deflected out of the underlayer may pass through layers above it and leak out of the optical touch pad. The deflecting structures may also be formed to deflect electromagnetic radiation returned to the optical touch pad from an object into confinement within the underlayer by total internal reflection.

The auxiliary waveguide layer may be optically coupled with at least one detector (e.g., one detector, two detectors, three detectors, four detectors, etc.), and may guide the electromagnetic radiation confined within the underlayer to the at least one detector such that the electromagnetic radiation arrives at the at least one detector with one or more properties indicative of information related to the object. Based on the detection of the electromagnetic radiation by the at least one detector, information related to the object may be determined. The information related to the object may include position information, object-type information, and/or other information. The auxiliary waveguide layer may be formed such that the amount of electromagnetic radiation deflected into and out of the underlayer may increase at distances further from the at least one detector optically coupled to the auxiliary waveguide layer.

DETAILED DESCRIPTION

Figure 1:
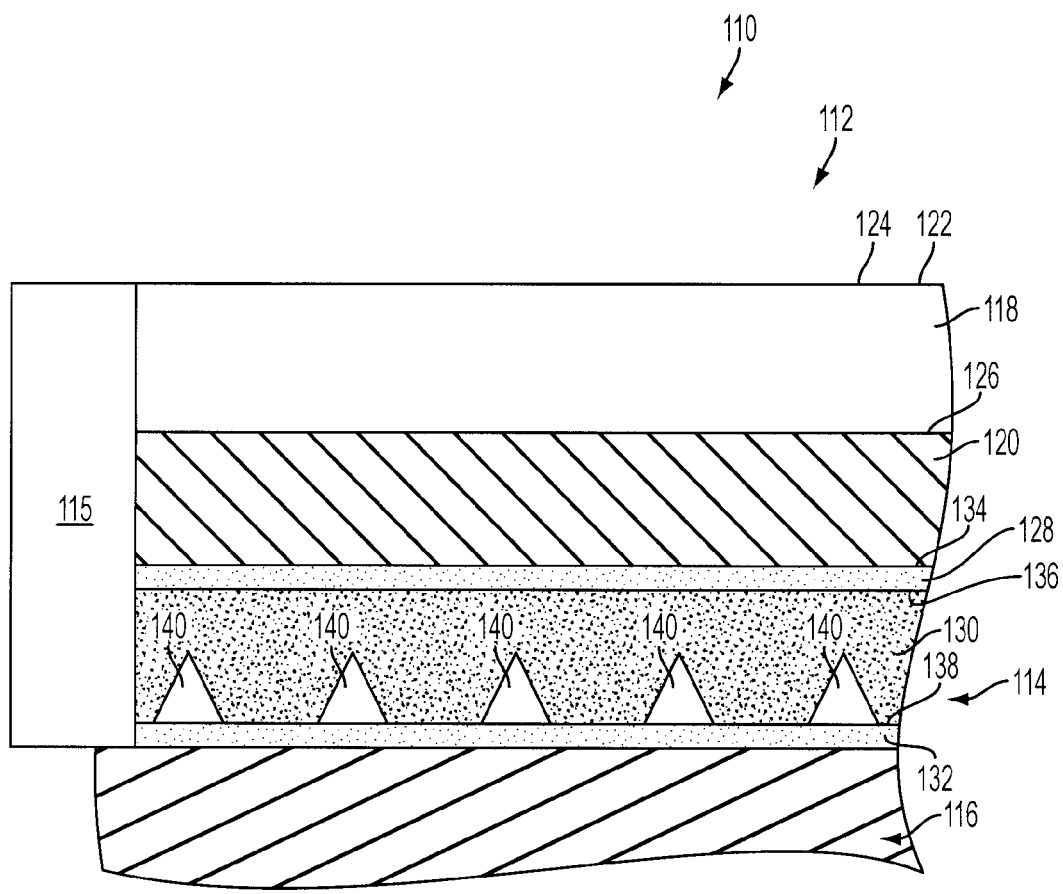
FIG. 1 is an exemplary illustration of an optical touch pad in accordance with one or more embodiments of the invention.

FIG. 1 illustrates a cross section of an optical touch pad 110 in accordance with one or more implementations of the invention. As is shown in FIG. 1, touch pad 110 may include a multilayer waveguide 112, at least one detector 115, and one or more additional layers. In some implementations, multilayer waveguide 112 may be optically coupled to at least one detector 115. Optical touch pad 110 may be mounted on a display 116. Display 116 may include an electronic display (e.g., a CRT display, an LCD display, a micro-mirror display, etc.), or other types of displays. In some implementations, display 116 may include a base object that does not emit electromagnetic radiation. For example display 116 may include a printed image over which optical touch pad 110 may be disposed, or display 116 may provide a surface for mounting optical touch pad 110 to that includes no image or electronic display. Other forms of display 116 may exist.

In some implementations, multilayer waveguide 112 may include at least a first waveguide layer 118 having a first index of refraction, and a second waveguide layer 120 having a second index of refraction. First waveguide layer 118 may be disposed toward an outer surface 122 of optical touch pad 110. In some instances, first waveguide layer 118 may provide outer surface 122 of optical touch pad 110. The first index of refraction may be selected such that a total internal reflection mirror ("TIR mirror") 124 may be formed at outer surface 122 between first waveguide layer 118 and ambient atmosphere (e.g., the first index of refraction may be greater than 1). The second index of refraction may be selected to be less than the first index of refraction such that a TIR mirror 126 may be formed at the boundary between first waveguide layer 118 and second waveguide layer 120 (e.g., the second index of refraction may be selected to be less than the first index of refraction). First waveguide layer 118 and/or second waveguide layer 120 may be optically coupled to the at least one detector 115.

According to various implementations, the one or more additional layers may include an auxiliary waveguide layer 114. Auxiliary waveguide layer 114 may include a first border layer 128, an underlayer 130, and a second border layer 132. First border layer 128 may be disposed adjacent to multilayer waveguide 112 on the opposite side of multilayer waveguide 112 from outer surface 122. Second border layer 132 may be disposed adjacent to a display 116. Underlayer 130 may be disposed between first border layer 128 and second border layer 132. First and second border layers 128 and 132 may have a third index of refraction. Underlayer 130 may have a fourth index of refraction. The third index of refraction may be selected such that a TIR mirror 134 may be formed at the boundary of first border layer 128 and second waveguide layer 120 (e.g., the third index of refraction may be less than the second index of refraction). The fourth index of refraction may be selected such that one TIR mirror 136 may be formed between first border layer 128 and underlayer 130 and another TIR mirror 138 may be formed between underlayer 130 and second border layer 132 (e.g., the fourth index of refraction may be selected to be less than the third index of refraction). Auxiliary waveguide layer 114 may be optically coupled to the at least one detector 115. In some such instances, underlayer 130 may be optically coupled to the at least one detector 115. As shown in FIG. 1, one or more deflecting structures 140 may be formed within underlayer 130. One or more deflecting structures may have an index of refraction lower than the fourth index of refraction. First and second border layers 128 and 132 may have different indices of refraction, while these respective indices of refraction may still be selected to maintain TIR mirrors 136 and 138.

In some instances, auxiliary waveguide layer 114 may be laminated directly to display 116. For example, second border layer 132 may be laminated directly to display 116. For example, in one implementation, second border layer 132 may be formed of a Sol-gel, and the index of refraction of second border layer 132 may be selected such that a layer of glass that provides the surface of display 116 on which second border layer 132 is mounted effectively becomes a functioning "layer" within optical touch pad 110. In this implementation, an additional TIR mirror may be formed at the boundary between the surface of the layer of glass included in display 116 opposite from second border layer 132 and the air within display 116. This may enable the incorporation of an additional "waveguide layer" into optical touchpad 110 (the layer of glass included in display 116) without increasing the size (e.g., the form factor, etc.) of optical touchpad 110.

In other implementations, auxiliary waveguide layer 114 may be formed without second border layer 132 and underlayer 130 may be laminated directly to display 116. However, in these implementations the fourth index of refraction must be sufficiently high to form TIR mirror 138 between underlayer 130 and display 116. Laminating auxiliary waveguide layer 114 directly to display 116 such that a surface of optical touch pad (e.g., the surface of second border layer 132 shown in contact with display 116) directly abuts display 116, rather than mounting optical touch pad 110 to display 116 such that a layer of air is formed therebetween, may enhance one or more aspects of optical touch pad 110.

For example, laminating optical touch pad 110 directly to display 116 may enhance a ruggedness of optical touch pad 110, may enable optical touch pad 110 to have a thinner form factor, may reduce an amount of high difference refractive index boundaries (e.g., a boundary between two substances with significantly different refractive indices, such as air and a glass, or air and a polymer) within multilayer waveguide 112, and/or enhance other aspects of optical touch pad 110. More particularly, a reduced number of high difference refractive index boundaries within optical touch pad 110 may reduce reflections of electromagnetic radiation being emitted by display 116 within optical touch pad 110. Reduced reflections may effectively increase display 116 contrast and resolution. Additionally, the thinness of the form factor of optical touch pad 110 may ensure that any reflections of electromagnetic radiation within optical touch pad 110 may be in close proximity to display 116. This may reduce the deterioration of image contrast and resolution caused by each unwanted reflection of electromagnetic radiation within optical touch pad 110. By reducing the amount of unwanted reflection of electromagnetic radiation within optical touch pad 110, and reducing the negative impact associated with remaining reflection, the readability, brightness, viewing angle, power consumption, and/or other features of the image being emitted and/or displayed by display 116 may be enhanced. For example, the display power budget in a conventional transflective LCD for PDA's and/or other mobile device\s may be boosted 30-50% compared with a standard solution based on resistive touch. These savings may be due in part to less Fresnel loss and a substantial lack of absorbing structures. The image quality may significantly improve, and this improvement may be traded off for a change from backlight to frontlight. This may add approximately 66% additional display power with little to no image degradation. The combined display power budget savings without image quality compromise may reach 76-83% which may be useful especially in power starved applications such as mobile devices. Other enhancements in power budget may be obtained with little to no image quality sacrifice by using, for instance, ambient radiation auto compensation, etc.

Figure 2:
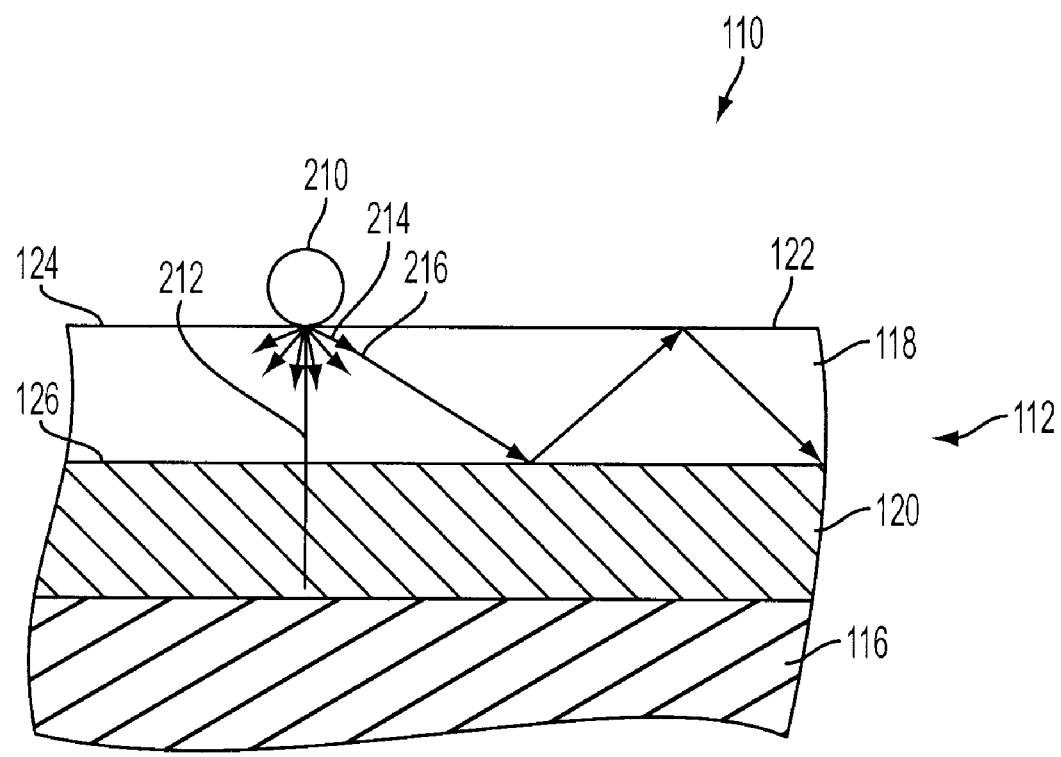
FIG. 2 is an exemplary illustration of an optical touch pad in accordance with one or more embodiments of the invention.
Figure 3:
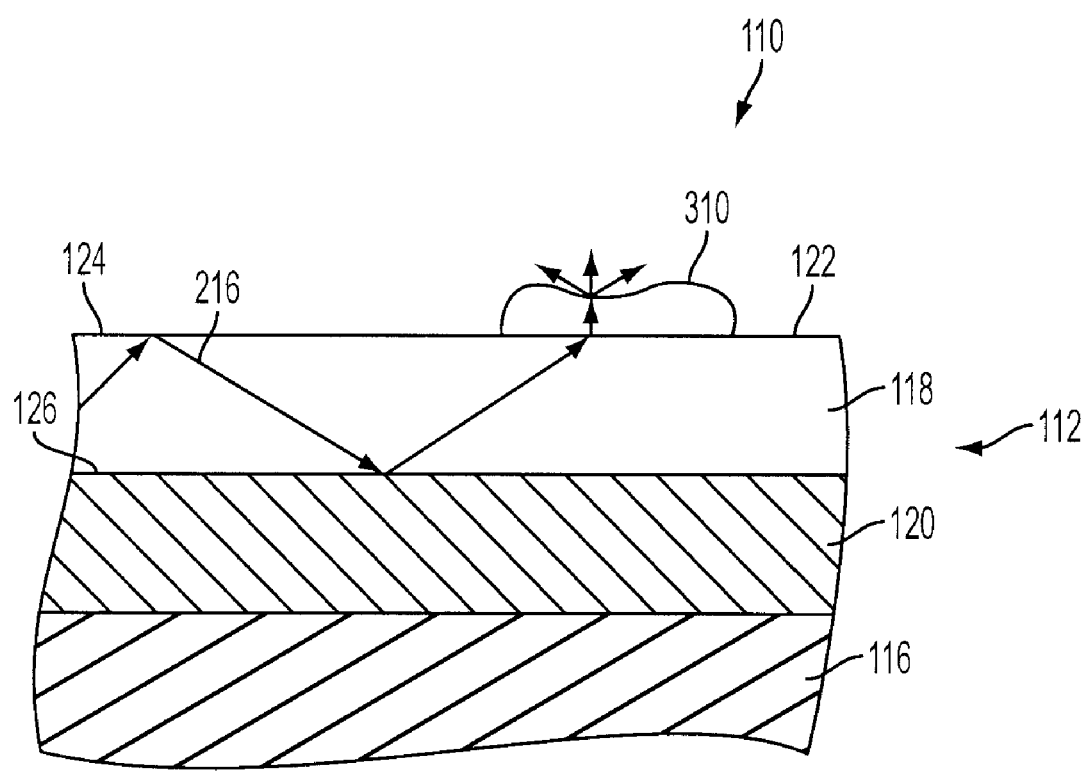
FIG. 3 is an exemplary illustration of an optical touch pad in accordance with one or more embodiments of the invention.
Figure 4:
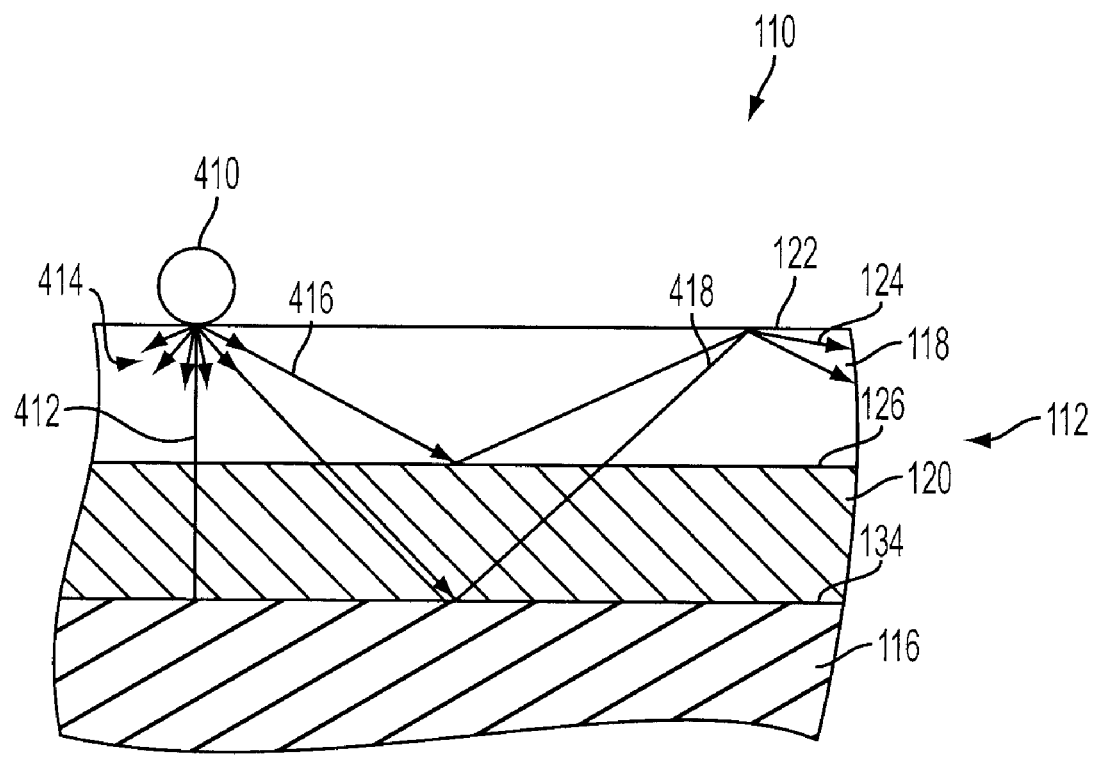
FIG. 4 is an exemplary illustration of an optical touch pad in accordance with one or more embodiments of the invention.

It should be appreciated that the implementations of optical touch pad 110 illustrated in FIG. 1 are not meant to be limiting with respect to the configuration of layers within optical touch pad 110 (e.g., additional layers may be added, and/or some layers shown may be omitted). Thus, for illustrative purposes, in the following description the general principles of operation of multilayer waveguide 112 may be explained with respect to implementations that include only some of the layers shown in FIG. 1 to simplify the explanation of some of the functionality of the layers illustrated and described. For example, FIGS. 2-4 illustrate some of the functionality of multilayer waveguide 112 according to one or more implementations in which auxiliary waveguide layer 114 is omitted from optical touch pad 110. However, it should be apparent from the description provided that the omission of auxiliary waveguide layer 114 from optical touch pad 110 may not substantively impact the operation of multilayer waveguide 110 in implementations in which optical touch pad may include auxiliary waveguide layer 114, such as those similar to the implementations illustrated in FIG. 1.

FIG. 2 illustrates a simplified example of the multilayer waveguide 112 to illustrate certain aspects of the invention. As shown in FIG. 2, multilayer waveguide 112 includes first waveguide layer 118 and second waveguide layer 120. Other layers may be used. Second waveguide layer 118 may be mounted (e.g., laminated) directly to display 116. Laminating second waveguide layer 120 to display 116 may provide some or all of the benefits (as well as additional benefits) of laminating optical touch pad 110 directly to display 116 discussed above.

In the absence of contact between an object 210 and surface 122, electromagnetic radiation emitted from display 116 (or other supporting structure) may proceed out of optical touch pad 110. The electromagnetic radiation emanating from optical touch pad 110 may then be incident on a viewer to enable the viewer to "see" the image being displayed, or emitted, by display 116.

In some implementations, when object 210 (e.g., a stylus, a finger, etc.) comes into contact with surface 122 of optical touch pad 110, electromagnetic radiation 212 (e.g., radiation emitted by display 116 and transmitted through surface 122, electromagnetic radiation emitted into multilayer waveguide 112 from emitters optically coupled to the periphery of multilayer waveguide 112, etc.) may interact with object 210 (e.g., be reflected, be backscattered, etc.) such that a portion of the electromagnetic radiation 212 may be dispersed and returned to multilayer waveguide 112 (illustrated as returned electromagnetic radiation 214) by virtue of the contact between object 210 and surface 122. Returned electromagnetic radiation 214 may include electromagnetic radiation 216, which may be incident on TIR mirror 126 at an angle of incidence greater than the critical angle of TIR mirror 126. As illustrated, electromagnetic radiation 216 may then be totally internally reflected back toward TIR mirror 124 where electromagnetic radiation 216 may again be totally internally reflected. Thus, by total internal reflection between TIR mirrors 124 and 126 electromagnetic radiation 216 may be directed by first waveguide layer 118 to at least one detector (e.g., detector 115 in FIG. 1). Based on the detection of electromagnetic radiation 216 by the at least detector 115, position information related to object 210 with respect to surface 122 (e.g., in the plane of surface 122) may be determined. For instance, position information related to object 210 may be determined based on the triangulation method described in International Patent Application Nos., PCT/DK2004/000595, PCT/DK2004/00165, PCT/DK2004/000596 and PCT/DK2003/00155, which are incorporated herein by reference. Other detection techniques can be used.

Figure 5:
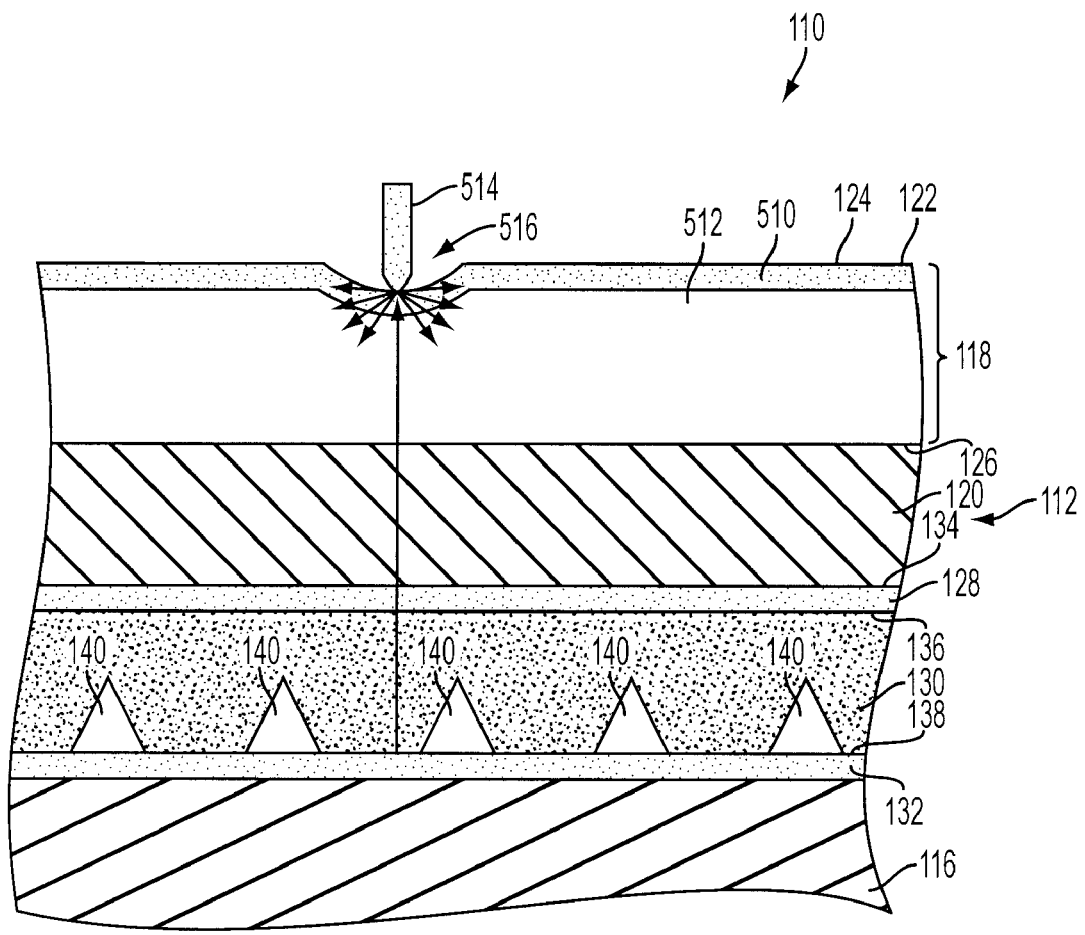
FIG. 5 is an exemplary illustration of an optical touch pad in accordance with one or more embodiments of the invention.
Figure 10:
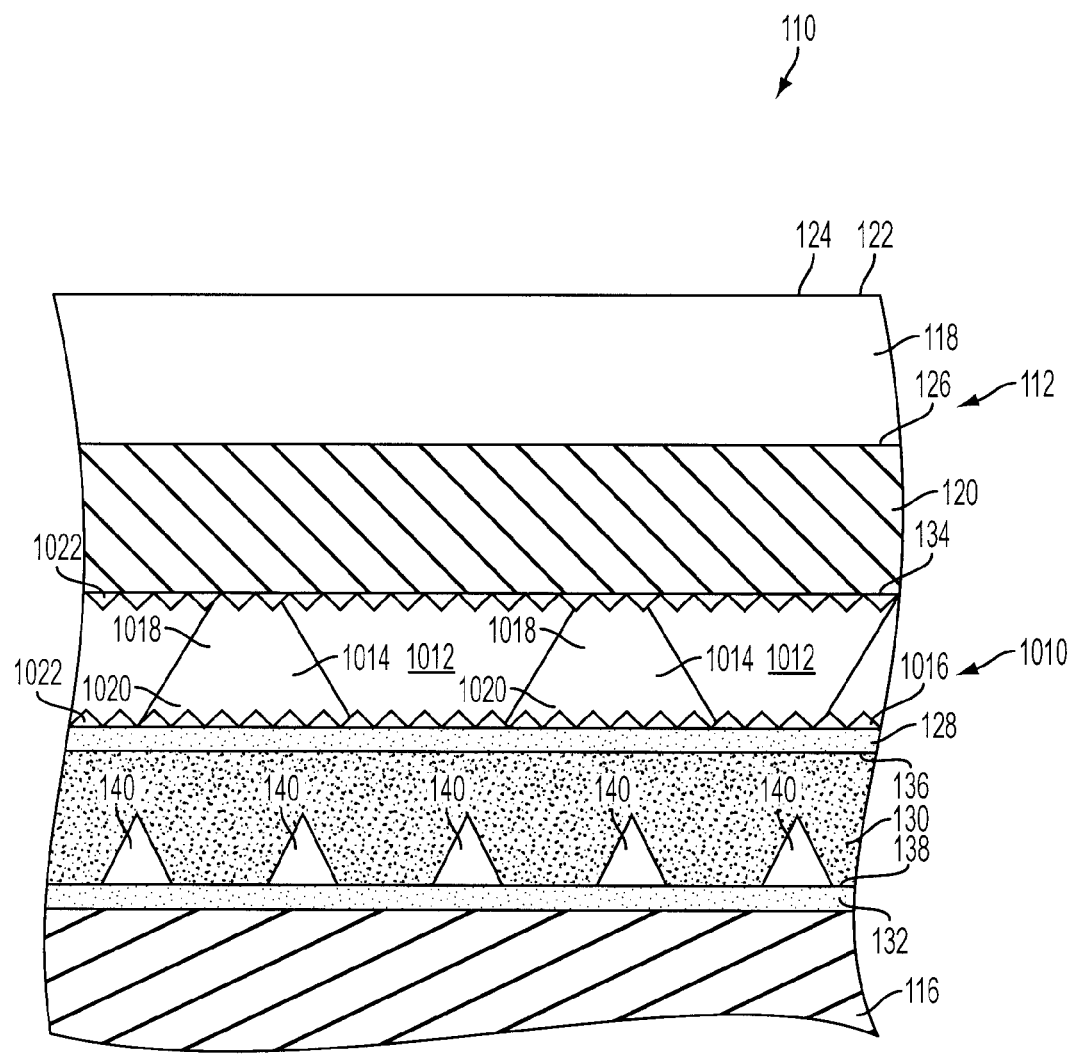
FIG. 10 is an exemplary illustration of an optical touch pad in accordance with one or more embodiments of the invention.
Figure 11:
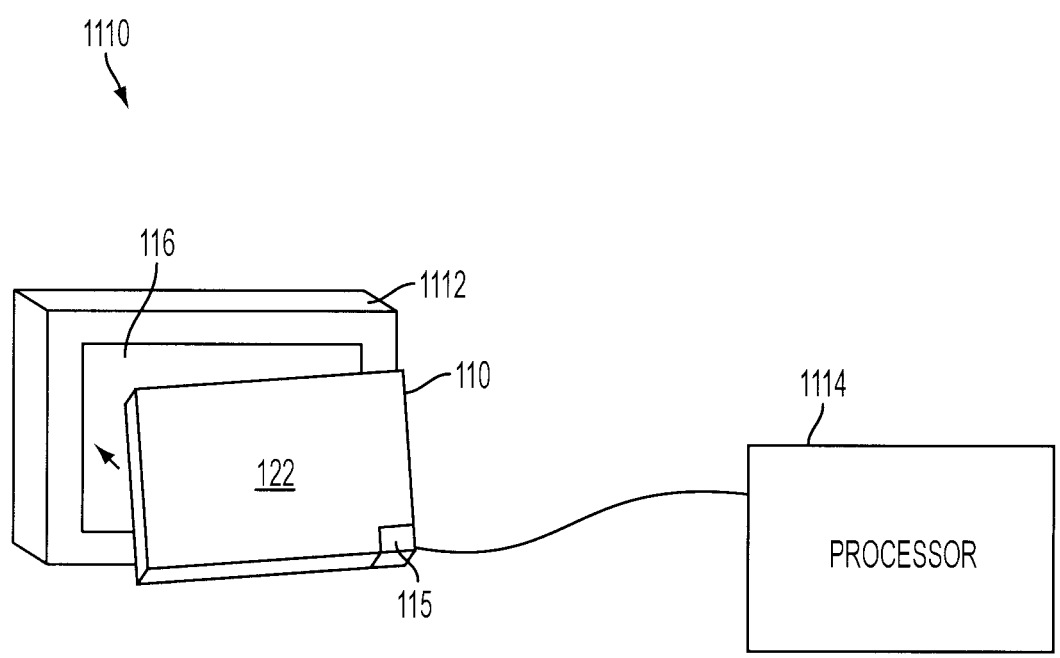
FIG. 11 is an exemplary illustration of a touch pad system in accordance with one or more embodiments of the invention.

Various other embodiments leverage these base principles to achieve other aspects of the invention. Features of these other embodiments may be used alone or in combination. For example, as depicted in FIG. 3, the effects of surface contaminants can be removed or reduced. In FIG. 4, the multilayer waveguide 112 may have properties to distinguish between electromagnetic radiation with different angles of incidence on and/or within multilayer waveguide 112 associated with different types of objects 210. In FIG. 5, the multilayer waveguide may include a first waveguide layer 118 comprising multiple layers that enhance the introduction of electromagnetic radiation into multilayer waveguide at high angles of incidence. In FIGS. 6-9, optical touch pad 110 may include auxiliary layer 114, in addition to or as a substitute for multilayer waveguide 112, to enable detection of information related an object proximate to or in contact with surface 122 of optical touch pad 110. In FIG. 10, a layer of air may be included in optical touch pad 110 to provide one or more TIR mirrors therein. In FIG. 11, optical touch pad 110 may be included in an optical touch pad system that determines information related to objects proximate to or in contact with optical touch pad 110.

Turning to FIG. 3, during normal usage, one or more surface contaminants 310 may come to reside on surface 122 of optical touch pad 110. For example, surface contaminants may include oil, grease, water, and/or other contaminants may be spilled, wiped, condensed, and/or otherwise deposited on surface 122. Contaminants 210 may enable electromagnetic radiation being directed by multilayer waveguide 112 to the at least one detector 115 by total internal reflection at TIR mirrors 124 and 126 to "leak" from multilayer waveguide 112. This leakage may inhibit determination of positional information (or other information) based on electromagnetic radiation 216. More particularly, as is shown in FIG. 3, in such instances, electromagnetic radiation 216 incident on TIR mirror 124 opposite contaminant 218 may pass out of multilayer waveguide 112 through TIR mirror 124 into contaminant 210. This leakage typically occurs because the index of refraction of contaminant 210 may be greater than the index of refraction of air (1), and therefore may increase the critical angle for TIR mirror 124.

Some contaminant materials that may become deposited on TIR mirror 124 may have refractive indices of roughly 1.3. In some implementations, the first index of refraction and the second index of refraction may be selected to substantially eliminate electromagnetic radiation "leakage" from within first waveguide layer 118 due to the presence of such contaminants on surface 122. For example, the second index of refraction may be selected to be greater than an expected refractive index of one or more contaminants, and the first index of refraction may be selected to be greater than the second index of refraction, in order to form TIR mirrors 124 and 126.

For example, to substantially eliminate "leakage" due to oil, grease, water, and/or other contaminants with refractive indices of roughly 1.3, the second index of refraction may be 1.35 and the first index of refraction may be 1.5. In these configurations, the angle of incidence of TIR mirror 126 will be greater than the angle of incidence of TIR mirror 124 in locations where a contaminant (e.g., contaminant 210) may be present. Thus, most, if not all, of electromagnetic radiation 216 confined within multilayer waveguide 112 by total internal reflection at TIR mirror 126 will also be totally internally reflected at locations on TIR mirror 124 opposite from the contaminant.

The recitation of specific values for the first and second indices of refraction are exemplary only, and are intended merely for illustrative purposes. Further, though this selection of indices of refraction to filter noise caused by surface contaminants has been described with respect to the configuration of optical touch pad 112 illustrated in FIGS. 2 and 3, the same principles may apply in other configurations, such as the configuration of optical touch pad 112 illustrated in FIG. 1 shown or described herein.

FIG. 4 illustrates another feature of multilayer waveguide 112 that may be used in one or more implementations. As illustrated in FIG. 4, first and second indices of refraction may be selected so that TIR mirror 134 may be formed between second waveguide layer 120 and display 116 (e.g., the second index of refraction may be greater than the index of refraction of display 116). In such implementations, when an object 410 is brought into contact with surface 122 of optical touch pad 110, electromagnetic radiation 412 (e.g. electromagnetic radiation emitted by display 116 and transmitted through surface 122, electromagnetic radiation emitted by one or more emitters optically coupled to the periphery of optical touch pad 110, etc.) may interact with object 328 (e.g., be reflected, be backscattered, etc.) such that a portion of electromagnetic radiation 412 may be dispersed and returned to multilayer waveguide 112 through TIR mirror 124 (illustrated as returned electromagnetic radiation 414). Returned electromagnetic radiation 414 may then become incident on TIR mirror 126.

Based on the index of refraction of object 410, the largest angle of incidence of returned electromagnetic radiation 414 on TIR mirror 126 may vary. For example, in instances in which the refractive index of object 410 is relatively higher (e.g., a stylus), the largest angle of incidence of electromagnetic radiation 414 may be relatively larger (illustrated as electromagnetic radiation 416). In instances in which the refractive index of object 410 is relatively lower (e.g., human tissue), the largest angle of incidence of electromagnetic radiation 414 may be relatively smaller (illustrated as electromagnetic radiation 418). The first and second refractive indices may be selected such that if object 410 is of a first object-type electromagnetic radiation 414 may include electromagnetic radiation 416 reflected at TIR mirror 126, while if object 410 is of a second object-type substantially all of electromagnetic radiation 414 will be electromagnetic radiation 418 that passes through TIR mirror 126.

For example, in such instances, if object 410 is of a relatively higher refractive type (e.g., a stylus) electromagnetic radiation 414 may include electromagnetic radiation 416 incident on TIR mirror 126 at greater than the critical angle of TIR mirror 126. Electromagnetic radiation 416 may then be totally internally reflected by TIR mirror 126, and become confined by total internal reflection within first waveguide layer 118. First waveguide layer 118 may then direct electromagnetic radiation 416 to the at least one detector 115. However, if object 410 is of a relatively lower refractive type (e.g. human tissue) electromagnetic radiation 414 may be comprised essentially of electromagnetic radiation 418 that is incident of TIR mirror 126 at less than the critical angle of TIR mirror 126.

In such implementations, second index of refraction may be selected such that a portion of electromagnetic radiation 418 may be totally internally reflected back toward first waveguide layer 118 by TIR mirror 134. This electromagnetic radiation 418 may also be guided to the at least one detector 115 by multilayer waveguide 112, by internal reflection between TIR mirror 124 and TIR mirror 134. Electromagnetic radiation 416 confined between TIR mirrors 124 and 126 may arrive at the at least one detector 115 at a different "bounce angle" than electromagnetic radiation 418 confined between TIR mirrors 124 and 128. In some instances, the at least one detector 115 may include a directional detector capable of determining the bounce angle of incoming electromagnetic radiation to enable determination of object-type information related to object 410.

In other instances, the at least one detector 115 may include one or more detectors optically coupled to each of first and second waveguide layers 118 and 120 individually. In these instances, the amount of electromagnetic radiation detected by the one or more detectors optically coupled to second waveguide layer 120 may be compared with the amount of electromagnetic radiation detected by the one or more detectors optically coupled to first waveguide layer 118. If object 410 includes a relatively higher refractive object, the amount of electromagnetic radiation detected by the one or more detectors coupled to first waveguide layer 118 may be larger than the amount of electromagnetic radiation detected by the one or more detectors optically coupled to second waveguide layer 120. However, if object 410 comprises a relatively lower refractive object, this may not be the case. Other methods for differentiating between electromagnetic radiation directed to the at least one detector may be used in other implementations.

Additionally, positional information related to object 410 may be determined from electromagnetic radiation 416 and/or 418 received by the at least one detector 115. For example, positional information may be determined in the manner described in International Patent Application Nos., PCT/DK2004/000595, PCT/DK2004/00165, PCT/DK2004/000596 and PCT/DK2003/00155, incorporated by reference above. Although in order to enhance the accuracy of the determination of positional information, prior to determining the positional information in instances in which object 410 includes a relatively higher refractive object, the amount of electromagnetic radiation detected by the one or more detectors optically coupled to second waveguide layer 120 may be subtracted from the amount of electromagnetic radiation detected by the one or more detectors coupled to first waveguide layer 118.

According to various implementations of the invention, a third (or more) waveguide layer (not shown) may be included in multilayer waveguide 112. The third waveguide layer may be disposed between second waveguide layer 120 and display 116, and may have an index of refraction selected so as to form TIR mirror 134 (e.g., the index of refraction of the third waveguide layer may be lower than the second index of refraction).

In other non-limiting implementations, multilayer waveguide 112 described above with respect to FIG. 4 may be provided in optical touch pad 110 with auxiliary waveguide layer 114. In such instances, the third index of refraction may be lower than the second index of refraction so that TIR mirror 134 may be formed between second waveguide layer 120 and auxiliary waveguide layer 114 (e.g., as shown in FIG. 1).

In some implementations similar to those shown and described above with respect to FIGS. 2-4, multilayer waveguide 112 may include first waveguide layer 118, while second waveguide layer 120 may be formed by a layer of glass included in display 116 (e.g., a glass pane provided on an electronic display device). When the layer of glass forms second waveguide layer 120 a boundary between the layer of glass and air that is internal to display 116 may form TIR mirror 134. This may decrease a form factor of optical touch pad 110, decrease reflection within optical touch pad 110, and/or decrease the negative impact of reflection remaining in optical touch pad 110. As was recited above, reducing the form factor, decreasing reflection within optical touch pad 110, and/or decreasing the negative impact of reflection remaining in optical touch pad 110, the readability, brightness, viewing angle, power consumption, and/or other features of the image being emitted and/or displayed by display 116 may be enhanced. To use the layer of glass included in display 116 as second waveguide layer 120, first waveguide layer 118 may be formed from a Sol-gel layer having a first index of refraction of 1.3-1.35.

In some implementations, first waveguide layer 118 may be formed so as to enhance the return of electromagnetic radiation by an object into multilayer waveguide 112, and/or provide one or more additional properties (e.g., scratch resistant properties, hydrophobic properties, hydrophilic properties, anti-reflective properties, etc.). For example, FIG. 5 illustrates optical touch pad 110, including multilayer waveguide 110 and auxiliary waveguide layer 114, in accordance with one or more such implementations of the invention. As illustrated in FIG. 5, multilayer waveguide 112 may include first waveguide layer 118 comprising an exterior layer 510 and an interior layer 512. Exterior layer 510 may form surface 122 of optical touch pad 110, and interior layer 512 may be disposed directly adjacent to exterior layer 510 on an opposite side of exterior layer 510 from surface 122. In some instances, exterior layer 510 may be composed of a relatively hard, resilient material, while interior layer 512 may be formed of a relatively soft, pliable material. For example, interior layer 512 may be formed from a transparent or translucent silicone with adequate softness and sponginess (ability to remember and resume original form in an adequate manner), and/or from one or more other transparent or translucent polymers. This configuration may enable an external force applied to exterior layer 510 by a stylus 514 (or other relatively hard object) to deform exterior layer 510 by creating an indent 516 in exterior layer 510 into interior layer 512. However, the relatively pliable composition of interior layer 512 may enable the deformation of exterior layer 510 to be supported by compression of interior layer 512.

In some implementations, to provide optical touch pad 110 with anti-reflective properties, anti-glare properties, hydrophilic properties, hydrophobic properties, and/or other properties, a coating providing one or more of these properties may be applied to first waveguide layer 118 at surface 122. For example, a spotted low index of refraction anti-glare coating (e.g., a Sol-gel coating, etc.) may be applied to first waveguide layer 118. The coating may be applied by ink-jet printing, and may be formed with hydrophilic areas surrounded by hydrophobic areas to control the exact form of the spots. The coating may have an index of refraction similar to contaminants such as grease and water, as any optical noise associated with such a coating may be filtered out (e.g., as described above), otherwise accounted for, and/or ignored.

According to some implementations, interior layer 512 may be relatively thin, and may have a relatively high shore value, in order to limit the movement of exterior layer 510 from contact with stylus 514. For example, a commercially available translucent polymer such as polycarbonate, acryl, ABS, PVC, PE, nylon, and/or other polymers may be used to form interior layer 512. A higher shore value may distribute the force applied by stylus 514 over a larger area, and support exterior layer 510 so that indent 516 may be formed with broader shoulders, and consequently less stress to exterior layer 510.

In various implementations, exterior layer 510 may be formed of a thin layer that may be plasma deposited, deposited using Sol-gel, be adhered onto multilayer waveguide 112 as a thin film with multiple layers, or otherwise be provided to multilayer waveguide 112. In some implementations, a low temperature Softplasma™ deposit process developed by Nanon may be used to adhere exterior layer 510 to interior layer 512. In such instances, Nanon's Softplasma™ process may prepare interior layer 512 to accept an exterior layer 510 that includes one or more Sol-gel coating and or adhesives. Via these same processes surface 122 may be provided with hydrophobic or hydrophilic characteristics by controlling the covalent bindings. A hydrophobic surface characteristic at surface 122 may inhibit stains and water from adhering to surface 122. A hydrophilic surface characteristic at surface 122 may inhibit the deposition of grease, as grease is hydrophobic, and may adhere less readily. Additionally, surface 122 may be provided with one or more scratch resistant characteristics.

To effectively direct electromagnetic radiation by total internal reflection at TIR mirrors 124 and 126, exterior layer 510 and interior layer 512 may be index matched. Further, as was discussed above, the index of refraction of waveguide layer 406 (and therefore, of exterior layer 510 and interior layer 512) may be relatively highly refractive. In some implementations, waveguide layer may include one or more additional layers (not shown) disposed between interior layer 512 and TIR mirror 126. The one or more additional layers may be index matched to exterior and interior layers 410 and 412.

As depicted, for example, in FIG. 5, by virtue of indent 516 in exterior layer 510, electromagnetic radiation 518 travelling within multilayer waveguide 112 (e.g., electromagnetic radiation emitted from display 116 toward surface 122, electromagnetic radiation emitted by one or more emitters optically coupled to the periphery of optical touch pad 110) may interact with stylus 514 (illustrated as electromagnetic radiation 520), and be returned to multilayer waveguide 112 with a higher angle of incidence to TIR mirror 126 than if contact between stylus 514 and surface 122 were present without indent 516. Detection of this difference in angle of incidence may facilitate determination of object-type information based on electromagnetic radiation directed by multilayer waveguide 112 to the at least one detector 115 in the manner described above.

The inclusion of various ones of the properties of the layers of multilayer waveguide 112 described herein may reduce optical signal noise in the electromagnetic radiation confined by total internal reflection within multilayer waveguide 112 (e.g., noise due to contaminants, noise due to surface scratches, etc.). The addition of a pliable layer within multilayer waveguide 112 (e.g., the implementations illustrated in either of FIGS. 5 and 9) in combination with one or more of the noise reducing properties of multilayer waveguide 112 described herein may enable multilayer waveguide 112 to reliably confine electromagnetic radiation in high angles, while allowing electromagnetic radiation to enter and/or leave multilayer waveguide 112 only when a change in topology of multilayer waveguide 112 occurs (e.g., when pressure from a point of touch deforms pliable second waveguide layer 120, forming an indent in multilayer waveguide 112). This may enhance a signal to noise relationship present in the electromagnetic radiation carried within multilayer waveguide 112.

Figure 6:
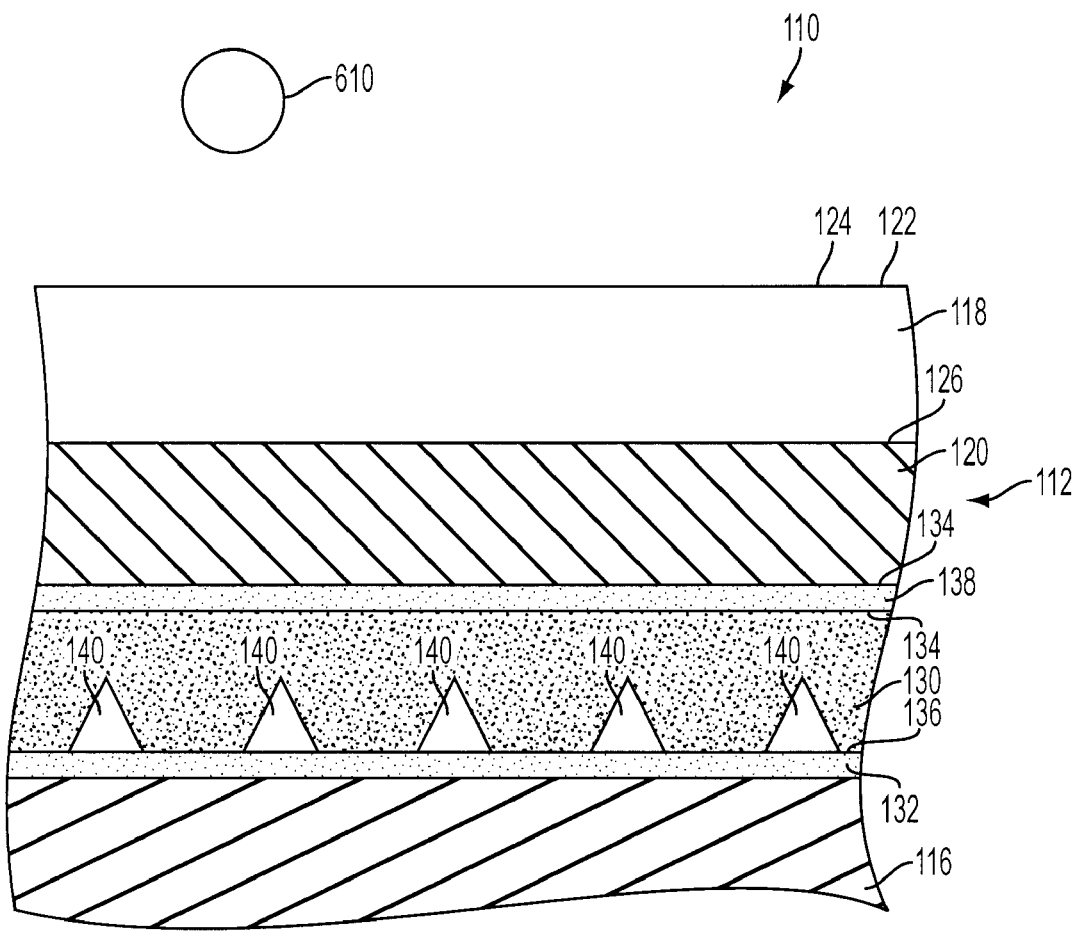
FIG. 6 is an exemplary illustration of an optical touch pad in accordance with one or more embodiments of the invention.

FIG. 6 is an exemplary illustration of optical touch pad 110, according to one or more implementations. Specifically FIG. 6 illustrates implementations of optical touch pad 110 in which information related to an object 610 may be determined when object 610 is in contact with surface 122, as well as when object 610 may be proximate to surface 122 (e.g., "hovering" over surface 122). The information related to object 610 may include positional information related to object 610 with respect to the position of object 610 in the plane of surface 122 and/or perpendicular to surface 122.

In the implementations illustrated in FIG. 6, electromagnetic radiation confined in underlayer 130 by internal reflection between TIR mirrors 136 and 138 may be guided to at least one detector (e.g., at least one detector 115 in FIG. 1) coupled to underlayer 130. Based on the detection of this electromagnetic radiation, the information related to object 610 may be determined.

Figure 7:
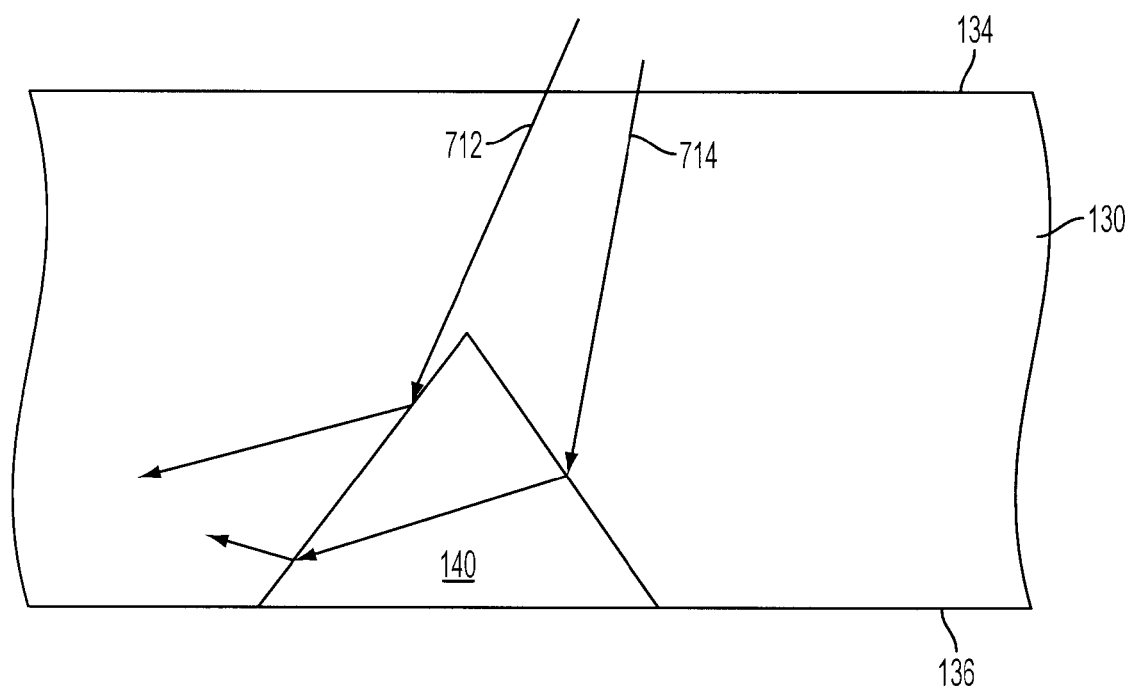
FIG. 7 is an exemplary illustration of an optical touch pad in accordance with one or more embodiments of the invention.

For example, as illustrated in FIG. 7, deflecting structures 140 may serve to deflect radiation that has been returned to optical touch pad by an object (e.g., object 610 in FIG. 6) toward the at least one detector 115. For example, electromagnetic radiation 712 may be incident on a surface of deflecting structure 140 at an angle of incidence greater than the critical angle between deflecting structure 140 and underlayer 130. In such cases electromagnetic radiation 712 may be totally internally reflected by deflecting structure 140 such that electromagnetic radiation becomes confined within underlayer 130 by total internal reflection between TIR mirrors 136 and 138. As another example, electromagnetic radiation 714 may become incident on deflecting structure 140 at an angle of incidence less than the critical angle between deflecting structure 140 and underlayer 130 such that electromagnetic radiation 714 may become bent at the boundary therebetween. Electromagnetic radiation 714 may then pass through deflecting structure 140 back into underlayer 130, again being bent at the boundary therebetween, at an angle that confines electromagnetic radiation 714 by total internal reflection between TIR mirrors 136 and 138.

Figure 8:
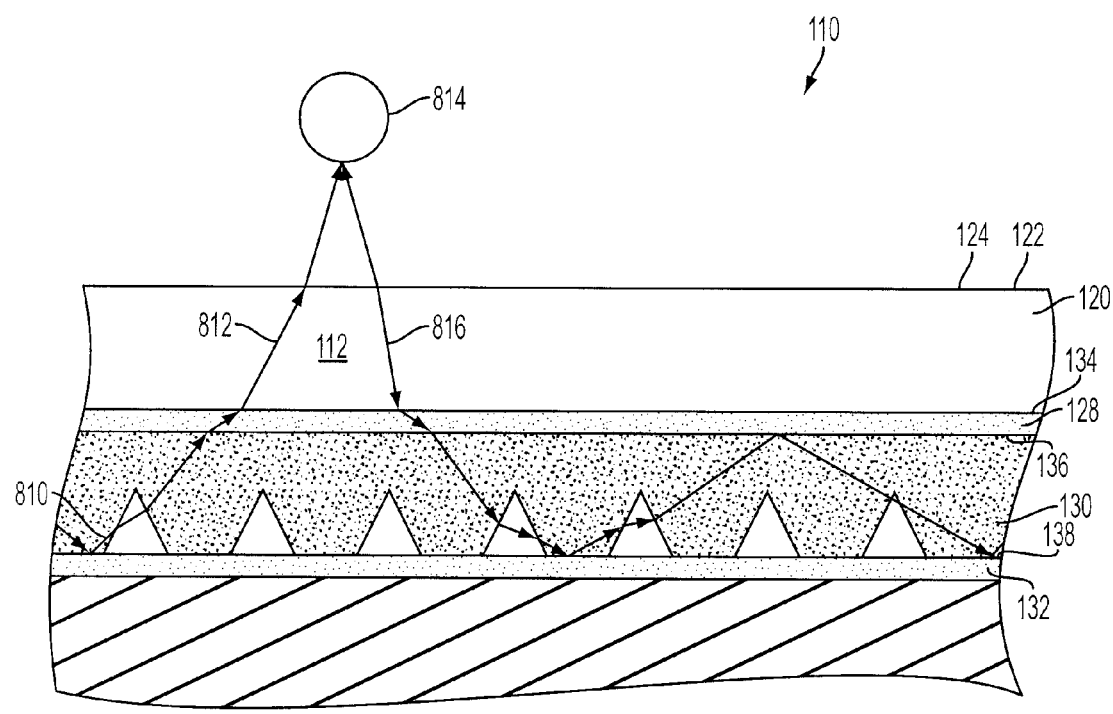
FIG. 8 is an exemplary illustration of a deflecting structure in accordance with one or more embodiments of the invention.

Turning to FIG. 8, as electromagnetic radiation 810 (e.g., electromagnetic radiation emitted by one or more emitters optically coupled to the periphery of optical touch pad 110) travels within underlayer 130 by total internal reflection between TIR mirrors 134 and 136 (e.g., electromagnetic radiation 714, 712, and/or 714, etc.), a portion of electromagnetic radiation 810 (shown as electromagnetic radiation 812) may be deflected out of underlayer 130 by deflecting structures 140 at angles slightly below the critical angles of TIR mirrors 136 and 138. This electromagnetic radiation 812 may be emitted from optical touch pad 110 to become incident on an object 814 positioned proximate to surface 122 (e.g., hovering over surface 122). As depicted in FIG. 8, a portion of electromagnetic radiation 812 (shown as electromagnetic radiation 816 may interact with object 814 (e.g., reflect, backscatter, etc.) and return to optical touch pad 110. Electromagnetic radiation 816 may be returned to optical touch pad 110 with an angle of incidence that enables electromagnetic radiation 816 to become confined within underlayer 130 by total internal reflection in one of the manners described above. Electromagnetic radiation 816 may then be directed to the at least one detector 115 such that based on the detection of electromagnetic radiation 816, information related to object 814 may be determined (e.g., position information, object-type information, etc.). For example, position information may be determined by triangulation. Object-type information related to the object (e.g., a hovering object or an object in contact with optical touch pad 110) may determined based on the relative intensity of electromagnetic radiation detected by the at least one detector 115.

As electromagnetic radiation travels with underlayer 130, being totally internally reflected at TIR mirrors 134 and 136, imperfections at the boundaries between underlayer 130 and boundary layers 128 and 132 may result in "edge reflections." The edge reflections caused by these imperfections may result in unwanted, non-ideal, scattering, and/or reflection of relatively small amounts of the electromagnetic radiation. In order to reduce the noise resulting from these edge reflections, an absorptive and/or deflective mechanism may be employed at TIR mirrors 134 and/or 136. For example, an absorptive coating may be applied between boundary layer 128 and underlayer 130 and/or between boundary layer 132 and underlayer 130.

It should be appreciated that although in FIGS. 7 and 8 the general operation and functionality of auxiliary waveguide layer 114 has been set forth in implementations of optical touch pad 110 including multilayer waveguide 112, this is not intended to be limiting. Some implementations exist in which optical touch pad 110 may not include multilayer waveguide 112, but instead may include auxiliary waveguide layer 114 (e.g., in some instances covered with a protective layer, such as a layer of glass) without multilayer waveguide 112. Additionally, another layer may be provided between multilayer waveguide 112 and auxiliary waveguide layer 114. In some implementations, the use of underlayeer 130 to direct electromagnetic radiation to at least one detector optically coupled thereto may enable mulilayer waveguide 112 to include waveguide layers with different indices of refraction in arrangements different than those described above (e.g., with indices of refraction that descend for waveguide layers positioned farther from surface 122).

Figure 9:
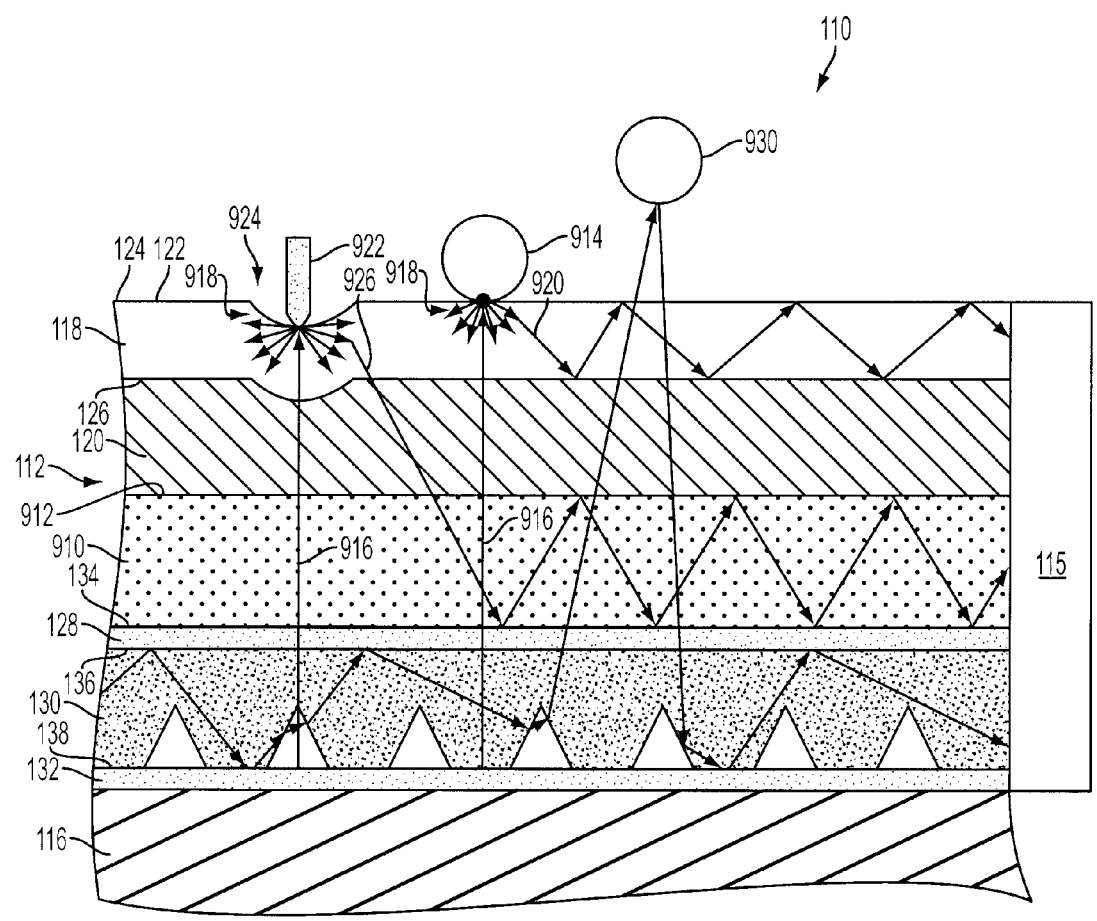
FIG. 9 is an exemplary illustration of an optical touch pad in accordance with one or more embodiments of the invention.

For example, FIG. 9 illustrates an implementation of optical touch pad 110 including multilayer waveguide 112 and auxiliary waveguide 114 in which multilayer waveguide 112 may include first waveguide layer 118, second waveguide layer 120, and a third waveguide layer 910. Third waveguide layer 910 may be formed between second waveguide layer 120 and first border layer 128. The third waveguide layer 910 may have a third index of refraction that is higher than the second index of refraction. This may cause a TIR mirror 912 between second waveguide layer 120 and third waveguide layer 910, and may cause TIR mirror 134 to be formed between third waveguide layer 910 and first border layer 128.

When an object 914 contacts surface 122, electromagnetic radiation 916 (e.g., radiation emitted by display 116 and transmitted through surface 122, electromagnetic radiation emitted by one or more emitters optically coupled to the periphery of optical touch pad 110, etc.) may interact with object 914 (e.g., be reflected, be backscattered, etc.) such that a portion of the electromagnetic radiation 916 may be dispersed and returned to multilayer waveguide 112 (illustrated as returned electromagnetic radiation 918) by virtue of the contact between object 914 and surface 122. Returned electromagnetic radiation 918 may include electromagnetic radiation 920, which may be incident on TIR mirror 126 at an angle of incidence greater than the critical angle of TIR mirror 126. By virtue of total internal reflection at TIR mirrors 124 and 126, electromagnetic radiation 920 may be directed to at least one detector 115 optically coupled to first waveguide layer 118.

In the implementation illustrated in FIG. 9, first waveguide layer 118 and third waveguide layer 910 may be formed of one or more relatively hard, rigid materials, and second waveguide layer 120 may be formed of a relatively soft, pliable material. Thus, an object 922 may contact surface 122 such that the force applied by object 922 may deform multilayer waveguide 112. More particularly, the force applied by object 922 may cause an indent 924 in first waveguide layer 118, which may compress second waveguide layer 120. Because of the contact between object 922 and surface 122, a portion of electromagnetic radiation 916 may be returned to multilayer waveguide 112 as electromagnetic radiation 918. While indent 924 is present in first waveguide layer 118, a portion of electromagnetic radiation 918 may pass through first waveguide layer 118 into second waveguide layer 120 at an angle of incidence to multilayer waveguide 112 greater than the critical angle between third waveguide layer 910 and first border layer 128 (illustrated as electromagnetic radiation 926). Electromagnetic radiation 926 may become confined within third waveguide layer 910, and may be directed to at least one detector 115 coupled thereto.

The relative hardness/softness of first, second, and/or third waveguide layers 118, 120, and 910, and the first, second, and third refractive indices may be determined to enable optical touch pad to distinguish between different object types (e.g., an object type of object 922 and an object type of object 922). More particularly, these properties of first, second, and/or third waveguide layers 118, 120, and 910 may be selected such that when softer objects contact surface 122, indent 924 may not form so as to enable electromagnetic radiation 926 to pass through TIR mirror 126, while contact from harder objects may create indent 924. Thus, by determining whether electromagnetic radiation received by at least one detector 115 includes electromagnetic radiation 926 confined within third waveguide layer 910 by total internal reflection, an object type of an object (e.g., object 922, object 914, etc.) may be determined. Electromagnetic radiation 918 and/or electromagnetic radiation 926 detected by at least one detector 115 may also enable position information related to an object in contact with surface 122 by one of the methods recited above.

The inclusion of auxiliary layer 114 in the configuration of multilayer waveguide 112 illustrated in FIG. 9 is not intended to be limiting. However, in implementations including auxiliary layer 114, auxiliary layer 114 may enable information related to an object 930 proximate to, but not in contact with, surface 122. For example, auxiliary layer 114 may function in the manner described above with respect to FIG. 8 to direct electromagnetic radiation to at least one detector 115 that enables position information related to object 930, or other information, to be determined.

For example, FIG. 10 illustrates optical touch pad 110 including a layer of air 1010 between multilayer waveguide 110 and underlayer 130, according to one or more implementations. Layer of air 1010 may include one or more pockets of air 1012 provided by support structures 1014, which support multilayer waveguide 112 on auxiliary waveguide layer 114. In such implementations, layer of air 110 may form TIR mirror 134, and may form a TIR mirror 1016 between layer of air 110 and boundary layer 128. Support structures 1014 may also provide a point of contact between multilayer waveguide 112 and lower surfaces (e.g., the surface auxiliary waveguide layer 114) through which a relatively small portion of electromagnetic radiation may enter and become trapped by total internal reflection. This electromagnetic radiation may then pass into multilayer waveguide 112 at a variety of different angles, including angles that may enable the electromagnetic radiation to be returned from an object (not shown) hovering over surface 122 to optical touch pad 110, as described above. As shown, support structures 1014 may be tapered, and may be oriented such that a smaller side 1018 may be disposed toward display 116, while a larger side 1020 may be disposed toward surface 122. In other implementations, this orientation may be reversed, however, while such implementations may reduce noise caused by support structures 1014, they may also reduce the amount of electromagnetic radiation that may be used to determine information related to a hovering object.

In some implementations, diffusing layers 1022 may include diffusing structures 1024. Diffusing structures 1024 may diffuse electromagnetic radiation emitting from display 116 to suppress one or more undesirable optical artefacts. For example, an undesirable optical artefacts may include wetout, Newton's rings, abrasions, moiré fringes, or other undesirable optical artefacts. Diffusing structures 1022 may include anti-reflective nano structures.

FIG. 11 is an exemplary illustration of a 1110 for determining information related to an object. For example, 1110 may determine position information (e.g., position, velocity, acceleration, jerk, etc.) of the object, an object type of the object, and/or other information related to the object. 1110 may include a display device 1112, optical touch pad 110, a device 1114, and/or other components. 1110 may enable determination an object type of an object in contact with surface 122 of optical touch pad 110, position information of an object with respect to surface 122, and/or other information.

In some implementations, optical touch pad 110 may be mounted over an image forming display 116 of display device 1112, such that electromagnetic radiation emitted by display 116 to form images may be transmitted through optical touch pad 110 so that the images may be viewable to a user. For instance, as has been discussed above, optical touch pad 110 may be laminated directly onto display 116. Display device 1112 and display 116 include, but are not limited to, electronic displays, such as flat-panel displays, and other base objects. For example, base objects such as car dashboards, toys, signage, ATM's, household appliances, and/or other base objects may serve as display device 1112 and display 116. Optical touch pad 110 may be mounted over a portion of display 116, all of display 116, may be mounted to overlap one or more of the boundaries of display 116, or otherwise be mounted to display 116.

According to various implementations of the inventions, optical touch pad 110 may include at least one detector 115 that may be operatively coupled to device 1114. As has been recited above, optical touch pad 110 may direct a portion of the electromagnetic radiation that has been incident on the object to the at least one detector 115. At least one detector 115 may generate one or more signals based on the received electromagnetic radiation. More particularly, in some instances, the one or more signals may represent one or more properties of the electromagnetic radiation (e.g., bounce angle, intensity, etc.). The one or more signals may be transmitted from detector 115 to device 1114 over the operative couple therebetween, and device 1114 may determine information related to the object based on the one or more signals.

What is claimed is:

1. An optical touch pad for determining a position of an object with respect to an external surface of the optical touch pad, the optical touch pad comprising:
  a multilayer waveguide comprising:
    a first waveguide layer bounded on at least one side by a first TIR mirror surface of a first TIR mirror, the first waveguide layer having a first index of refraction;
    a second waveguide layer bounded on at least one side by a second TIR mirror surface of a second TIR mirror, the second waveguide having a second index of refraction; and
  wherein the first waveguide layer comprises a rigid layer that comprises the external surface of the optical touch pad and a pliable layer that is directly adjacent to the external layer, wherein the rigid layer is more rigid than the pliable layer and the pliable layer is more pliable than the rigid layer, and wherein when an external force is applied to the external layer that deforms the external layer into the pliable layer, the pliable layer compresses without substantially stressing any other layers within the multilayer waveguide; wherein the multilayer waveguide is configured to direct electromagnetic radiation by total internal reflection to at least one detector to enable the detector to determine the position of the object with respect to the external surface; and wherein the rigid layer and the pliable layer are index of refraction matched.

2. An optical touch pad for determining the position of an object with respect to an external surface of the optical touch pad, the optical touch pad comprising:
  a multilayer waveguide comprising:
    a first waveguide layer bounded on at least one side by a first TIR mirror surface of a first TIR mirror, the first waveguide layer having a first index of refraction;
    a second waveguide layer bounded on at least one side by a second TIR mirror surface of a second TIR mirror, the second waveguide having a second index of refraction; and
  the multilayer waveguide being designed to direct electromagnetic radiation by total internal reflection to at least one detector to enable the detector to determine the position of the object with respect to the external surface, wherein the multilayer waveguide is positioned to:
    i) receive electromagnetic radiation from an object that comes in contact with the external surface, the object being one of at least a first type of object that has first refractive characteristics or a second type of object that has second refractive characteristics; and ii) direct the received electromagnetic radiation to the at least one detector by total internal reflection such that the processor receives the at least one signal from the at least one detector and determines the type of object.

3. The optical touch pad of claim 2, wherein the first object type comprises a relatively higher refractive object type and the second object type comprises a relatively lower refractive object type.

4. The optical touch pad of claim 2, wherein the first object type comprises a stylus and the second object type comprises a human tissue.

5. The optical touch pad of claim 2, wherein the refractive characteristics relate to an angle of reflection of electromagnetic radiation refracted by the object.

6. An optical touch pad for determining the position of an object with respect to an external surface of the optical touch pad, the optical touch pad comprising:
- a multilayer waveguide comprising:
  - a first waveguide layer bounded on at least one side by a first TIR mirror surface of a first TIR mirror, the first waveguide layer having a first index of refraction;
  - a second waveguide layer bounded on at least one side by a second TIR mirror surface of a second TIR mirror, the second waveguide having a second index of refraction; and
  - one or more additional waveguide layers, each additional waveguide layer being bounded on at least one side by a TIR mirror, and wherein each additional waveguide layer has an index of refraction that is different from the index of refraction of other waveguide layers within the multilayer waveguide;
- wherein the multilayer waveguide is configured to direct electromagnetic radiation by total internal reflection to at least one detector to enable the detector to determine the position of the object with respect to the external surface, and wherein the waveguide layers are arranged within the multilayer waveguide in order of index of refraction, with the waveguide layer with the highest index of refraction being disposed closest to the external surface of the optical touch pad and the waveguide layer with the lowest index of refraction being disposed furthest from the external surface.

7. An optical touch pad for determining the position of an object with respect to an external surface of the optical touch pad, the optical touch pad comprising:
- a multilayer waveguide comprising:
  - a first waveguide layer bounded on at least one side by a first TIR mirror surface of a first TIR mirror, the first waveguide layer having a first index of refraction;
  - a second waveguide layer bounded on at least one side by a second TIR mirror surface of a second TIR mirror, the second waveguide having a second index of refraction; and
  - the multilayer waveguide being designed to direct electromagnetic radiation by total internal reflection to at least one detector to enable the detector to determine the position of the object with respect to the external surface, wherein the first waveguide layer comprises a rigid layer that comprises the external surface of the optical touch pad and a pliable layer that is directly adjacent to the external layer, wherein the rigid layer is more rigid than the pliable layer and the pliable layer is more pliable than the rigid layer, wherein the pliable layer and the external layer are substantially index of refraction matched, wherein when an external force is applied to the external layer that deforms the external layer into the pliable layer, the pliable layer compresses without substantially stressing any other layers within the multilayer waveguide, and wherein the multilayer waveguide further comprises a layer comprising pockets of air, anti-reflective nano structures disposed in the layer comprising pockets of air, and an angle selective TIR mirror, the layer comprising pockets of air further comprising supporting structures that support the layers adjacent to the layer comprising pockets of air such that the pockets of air are formed between the adjacent layers.

8. The optical touch pad of claim 7, wherein the second waveguide layer is disposed on a side of the first waveguide layer opposite from the external surface of the touch pad, the layer comprising pockets of air is disposed on a side of the second waveguide layer opposite from the first waveguide layer, and the angle selective TIR mirror is disposed on a side of the layer comprising pockets of air opposite from the second waveguide layer.

9. The optical touch pad of claim 8, wherein the multilayer waveguide comprises a TIR mirror separator layer disposed between the second waveguide layer and the layer comprising pockets of air.

10. The optical touch pad of claim 7, wherein the TIR mirror is mountable directly onto a display.

11. The optical touch pad of claim 10, wherein the display comprises an electronic display.

12. The optical touch pad of claim 10, wherein the display comprises a computer monitor or a television display.

13. The optical touch pad of claim 10, wherein the display comprises a display of a mobile electronic device.

14. The optical touch pad of claim 7, wherein the multilayer waveguide further comprises a TIR mirror that forms a surface of the multilayer waveguide opposite from the external surface of the optical touch pad, and wherein the TIR mirror is mountable directly onto a display.

15. The optical touch pad of claim 14, wherein the display comprises an electronic display.

16. The optical touch pad of claim 14, wherein the display comprises a computer monitor or a television display.

17. The optical touch pad of claim 14, wherein the display comprises a display of a mobile electronic device.

18. An integrated touch pad and image forming display, comprising:
- an image forming display and
- a touch pad laminated to the image forming display, the touch pad being capable of determining a position of an object with respect to an external surface of the touch pad, the touch pad comprising:
  - a multilayer waveguide comprising:
    - a first boundary layer bounded on at least one side by a first TIR mirror surface of a first TIR mirror, the first boundary layer having a first boundary index of refraction;
    - a second boundary layer bounded on at least one side by a second TIR mirror surface of a second TIR mirror, the second boundary having a second boundary index of refraction;
    - an underlayer having an underlayer index of refraction and being disposed between the first boundary layer and the second boundary layer; and
    - a plurality of deflecting structures having a structure index of refraction that is lower than the underlayer index of refraction;
    - wherein the first and second boundary indices of refraction are lower than the underlayer index of refraction, wherein the deflecting structures are disposed within the underlayer; and wherein the multilayer waveguide directs electromagnetic radiation to at least one detector by total internal reflection to enable the detector to determine the position of the object with respect to the external surface.

19. The touch pad and display of claim 18, wherein the first boundary index of refraction is higher than the second boundary index of refraction.

20. The touch pad and display of claim 18, wherein the first boundary index of refraction is higher than the second boundary index of refraction, and wherein the second boundary layer is on an opposite side of the first boundary layer from the external surface of the touch pad.

21. The touch pad and display of claim 18, wherein the multilayer waveguide forms a plurality of TIR mirrors for segmenting angles of reflection of electromagnetic radiation received from an object in contact with the external surface.

22. The touch pad and display of claim 18, wherein the multilayer waveguide forms a plurality of TIR mirrors for segmenting angles of reflection of electromagnetic radiation received from an object in contact with or hovering above the external surface.

23. The touch pad and display of claim 18, wherein a surface of the first boundary layer comprises the external surface of the touch pad.

24. The touch pad and display of claim 18, wherein the touch pad comprises at least one additional layer and the external surface of the touch pad comprises a surface of the additional layer.

25. The touch pad and display of claim 18, wherein the touch pad comprises at least one additional layer and the external surface of the touch pad comprises a surface of the additional layer; wherein the at least one additional layer comprises a soft layer near the external surface that is softer than the first boundary layer and the second boundary layer, and wherein the soft layer, in response to being touched by an object, is:
  deformable to allow radiation otherwise trapped by TIR to illuminate the object, and
  configured to receive backscattered light from the object that can be trapped by TIR in one or more of the layers within the multilayer waveguide.

26. The touch pad and display of claim 18, wherein the first boundary layer comprises a rigid layer that comprises the external surface of the touch pad and a pliable layer that is directly adjacent to the external layer, wherein the rigid layer is more rigid than the pliable layer and the pliable layer is more pliable than the rigid layer, and wherein when an external force is applied to the external layer that deforms the external layer into the pliable layer, the pliable layer compresses without substantially stressing any other layers within the multilayer waveguide.

27. The touch pad and display of claim 26, wherein the rigid layer and the pliable layer are index of refraction matched.

28. The touch pad and display of claim 18, wherein the first boundary layer comprises a rigid layer that comprises the external surface of the touch pad, wherein the second boundary layer comprises a pliable layer, wherein the rigid layer is more rigid than the pliable layer and the pliable layer is more pliable than the rigid layer, and wherein when an external force is applied to the first boundary layer that deforms the first boundary layer into the second boundary layer, the second boundary layer compresses without substantially straining any other layers within the multilayer waveguide.

29. The touch pad and display of claim 28, wherein the first boundary index of refraction is greater than the second boundary index of refraction.

30. The touch pad and display of claim 18, wherein the multilayer waveguide further comprises an underlayer bounded by TIR mirrors and a plurality of deflecting structures for deflecting electromagnetic radiation into the underlayer.

31. The touch pad and display of claim 18, wherein the multilayer waveguide is positioned to: i) receive electromagnetic radiation from an object that comes in contact with the external surface, the object being one of at least a first type of object that has first refractive characteristics or a second type of object that has second refractive characteristics; and ii) direct the received electromagnetic radiation to the at least one detector by total internal reflection such that the processor receives the at least one signal from the at least one detector and determines the type of object.

32. The touch pad and display of claim 31, wherein the first object type comprises a relatively higher refractive object type and the second object type comprises a relatively lower refractive object type.

33. The touch pad and display of claim 32, wherein the first object type comprises a stylus and the second object type comprises a human tissue.

34. The touch pad and display of claim 33, wherein the refractive characteristics relate to an angle of reflection of electromagnetic radiation refracted by the object.

35. The touch pad and display of claim 18, wherein the multilayer waveguide further comprises one or more additional waveguide layers, each additional waveguide layer being bounded on at least one side by a TIR mirror, and wherein each additional waveguide layer has an index of refraction that is different from the index of refraction of other layers within the multilayer waveguide.

36. The touch pad and display of claim 35, wherein the layers are arranged within the multilayer waveguide in order of index of refraction, with the layer with the highest index of refraction being disposed closest to the external surface of the touch pad and the layer with the lowest index of refraction being disposed furthest from the external surface.

37. The touch pad and display of claim 18, wherein the external surface of the touch pad comprises scratch resistant properties.

38. The touch pad and display of claim 18, wherein the external surface of the touch pad comprises hydrophobic properties.

39. The touch pad and display of claim 18, wherein the external surface of the touch pad comprises anti-glare properties.

40. The touch pad and display of claim 18, wherein a spotted low index of refraction anti-glare coating is applied to the external surface of the touch pad, compared to the first boundary index of refraction.

41. The touch pad and display of claim 18, further comprising a layer of air supported by structures that support the multilayer waveguide such that the layer of air is formed between the multilayer waveguide and an adjacent layer of the touch pad or the display.

42. The touch pad and display of claim 18, wherein the multilayer waveguide further comprises anti-reflective nano structures disposed in the layer of air.

43. The touch pad and display of claim 18, wherein the first boundary layer comprises a rigid layer that comprises the external surface of the touch pad and a pliable layer that is directly adjacent to the external layer, the pliable layer and the external layer being substantially index of refraction matched, wherein the rigid layer is more rigid than the pliable layer and the pliable layer is more pliable than the rigid layer, wherein when an external force is applied to the external layer that deforms the external layer into the pliable layer, the pliable layer compresses without substantially stressing any other layers within the multilayer waveguide, and wherein the multilayer waveguide further comprises a layer comprising pockets of air, anti-reflective nano structures disposed in the layer comprising pockets of air, and an angle selective TIR mirror, the layer comprising pockets of air further comprising supporting structures that support the layers adjacent to the layer comprising pockets of air such that the pockets of air are formed between the adjacent layers.

44. The touch pad and display of claim 43, wherein the second boundary layer is disposed on a side of the first boundary layer opposite from the external surface of the touch pad, the layer comprising pockets of air is disposed on a side of the second boundary layer opposite from the first boundary layer, and the angle selective TIR mirror is disposed on a side of the layer comprising pockets of air opposite from the second boundary layer.

45. The touch pad and display of claim 44, wherein the multilayer waveguide comprises a TIR mirror disposed between the second boundary layer and the layer comprising pockets of air.

46. The touch pad and display of claim 45, wherein the TIR mirror is mountable directly onto the display.

47. The touch pad and display of claim 18, wherein the display comprises an electronic display.

48. The touch pad and display of claim 18, wherein the display comprises a computer monitor or a television display.

49. The touch pad and display of claim 18, wherein the display comprises a display of a mobile electronic device.

50. The touch pad and display of claim 18, wherein the multilayer waveguide is mounted directly to the display such that a TIR mirror is formed between a surface of the multilayer waveguide opposite from the external surface of the optical touch pad and the display.

51. The touch pad and display of claim 18, wherein the detector comprises a directional detector.

52. An integrated optical touch pad and image forming display, comprising:
an image forming display and
an optical touch pad laminated to the image forming display, the optical touch pad being capable of determining a position of an object with respect to an external surface of the optical touch pad, the optical touch pad comprising:
a multilayer waveguide comprising:
a first waveguide layer bounded on at least one side by a first TIR mirror surface of a first TIR mirror, the first waveguide layer having a first index of refraction;
a second waveguide layer bounded on at least one side by a second TIR mirror surface of a second TIR mirror, the second waveguide having a second index of refraction; wherein the multilayer waveguide directs electromagnetic radiation to at least one detector by total internal reflection to enable the detector to determine the position of the object with respect to the external surface;
and wherein the multilayer waveguide is mounted directly to an outer surface of a substantially transparent substrate integrally included in the display such that the substantially transparent substrate forms a waveguide layer capable of directing electromagnetic radiation by total internal reflection within the substantially transparent substrate, the total internal reflection occurring at one or both of the TIR mirror formed at the boundary between the multilayer waveguide and the outer surface of the substantially transparent substrate and a TIR mirror formed at a boundary between the inner surface of the substantially transparent substrate and air within the display.

53. An integrated touch pad and image forming display, comprising:
an image forming display and
a touch pad laminated to the image forming display, the touch pad being capable of determining a position of an object with respect to an external surface of the touch pad, the touch pad comprising:
a multilayer waveguide comprising:
a first waveguide layer bounded on at least one side by a first TIR mirror surface of a first TIR mirror, the first waveguide layer having a first index of refraction and being disposed on an opposite side of the multilayer waveguide from the external surface;
a second waveguide layer bounded on at least one side by a second TIR mirror surface of a second TIR mirror, the second waveguide having a second index of refraction;
an underlayer having an underlayer index of refraction and being disposed between the first boundary layer and the second boundary layer; and
a plurality of deflecting structures having a structure index of refraction and being disposed within the underlayer;
wherein the first and second indices of refraction and the structure index of refraction are lower than the underlayer index of refraction, and wherein the first and second waveguide layers, the underlayer, and the deflecting structures are designed such that the deflecting structures deflect electromagnetic radiation within the underlayer so that the deflected electromagnetic radiation is guided within the underlayer by total internal reflection to at least one detector to enable the detector to determine the position of the object with respect to the external surface of the touch pad.

54. The touch pad and display of claim 53, wherein the touch pad is mounted directly to a display layer that is an integral component of the display such that the display layer functions as the second waveguide layer.

55. The touch pad and display of claim 53, wherein the electromagnetic radiation guided within the underlayer by total internal reflection enables the detector to determine the position of the object with respect to the external surface when the object is hovering above the external surface of the touch pad.

56. An optical touch pad system for determining a position of an object with respect to an external surface of the optical touch pad, comprising:
a multilayer waveguide comprising:
a first waveguide layer bounded on at least one side by a first TIR mirror surface of a first TIR mirror, the first waveguide layer having a first index of refraction;
a second waveguide layer bounded on at least one side by a second TIR mirror surface of a second TIR mirror, the second waveguide having a second index of refraction;
an underlayer having an underlayer index of refraction and being disposed between the first boundary layer and the second boundary layer; and
a plurality of deflecting structures having a structure index of refraction that is lower than the underlayer index of refraction; and
at least one detector for receiving electromagnetic radiation from at least one layer of the multilayer waveguide and generating a signal relating to the position of the object with respect to the external surface of the optical touch pad;
wherein the first and second indices of refraction are lower than the underlayer index of refraction, wherein the deflecting structures are disposed within the underlayer, and wherein the multilayer waveguide is positioned to: i) receive electromagnetic radiation having characteristics affected by the position of an object with respect to an external surface of the optical touch pad, wherein the characteristics of the electromagnetic radiation include one or both of propagation and/or intensity; and ii) direct the received electromagnetic radiation to the at least one detector by total internal reflection; and a processor that receives the at least one signal from the at least one detector and determines position information regarding the object.

57. The system of claim 56, wherein the first index of refraction is higher than the second index of refraction.

58. The system of claim 56, wherein the first index of refraction is higher than the second index of refraction, and wherein the second waveguide layer is on an opposite side of the first waveguide layer from the external surface of the optical touch pad.

59. The system of claim 56, wherein the multilayer waveguide forms a plurality of TIR mirrors for segmenting angles of reflection of electromagnetic radiation received from an object in contact with the external surface.

60. The system of claim 56, wherein the multilayer waveguide forms a plurality of TIR mirrors for segmenting angles of reflection of electromagnetic radiation received from an object in contact with or hovering above the external surface.

61. The system of claim 56, wherein a surface of the first waveguide layer comprises the external surface of the optical touch pad.

62. The system of claim 56, wherein the optical touch pad comprises at least one additional layer and the external surface of the optical touch pad comprises a surface of the additional layer.

63. The system of claim 56, wherein the optical touch pad comprises at least one additional layer and the external surface of the optical touch pad comprises a surface of the additional layer; wherein the at least one additional layer comprises a soft layer near the external surface that is softer than the first waveguide layer and the second waveguide layer, and wherein the soft layer, in response to being touched by an object, is:

deformable to allow radiation otherwise trapped by TIR to illuminate the object, and configured to receive backscattered light from the object that can be trapped by TIR in one or more of the waveguide layers.

64. The system of claim 56, wherein the first waveguide layer comprises a rigid layer that comprises the external surface of the optical touch pad and a pliable layer that is directly adjacent to the external layer, wherein the rigid layer is more rigid than the pliable layer and the pliable layer is more pliable than the rigid layer, and wherein when an external force is applied to the external layer that deforms the external layer into the pliable layer, the pliable layer compresses without substantially stressing any other layers within the multilayer waveguide.

65. The system of claim 64, wherein the rigid layer and the pliable layer are index of refraction matched.

66. The system of claim 56, wherein the first waveguide layer comprises a rigid layer that comprises the external surface of the optical touch pad, wherein the second waveguide layer comprises a pliable layer, wherein the rigid layer is more rigid than the pliable layer and the pliable layer is more pliable than the rigid layer, and wherein when an external force is applied to the first waveguide layer that deforms the first waveguide layer into the second waveguide layer that deforms the first waveguide layer into the second waveguide layer, the second waveguide layer compresses without substantially straining any other layers within the multilayer waveguide.

67. The system of claim 66, wherein the first index of refraction is greater than the second index of refraction.

68. The system of claim 56, wherein the multilayer waveguide further comprises an underlayer bounded by TIR mirrors and a plurality of deflecting structures for deflecting electromagnetic radiation into the underlayer.

69. The system of claim 56, wherein the multilayer waveguide is positioned to: i) receive electromagnetic radiation from an object that comes in contact with the external surface, the object being one of at least a first type of object that has first refractive characteristics or a second type of object that has second refractive characteristics; and ii) direct the received electromagnetic radiation to the at least one detector by total internal reflection such that the processor receives the at least one signal from the at least one detector and determines the type of object.

70. The system of claim 69, wherein the first object type comprises a relatively higher refractive object type and the second object type comprises a relatively lower refractive object type.

71. The system of claim 69, wherein the first object type comprises a stylus and the second object type comprises a human tissue.

72. The system of claim 69, wherein the refractive characteristics relate to an angle of reflection of electromagnetic radiation refracted by the object.

73. The system of claim 56, wherein the multilayer waveguide further comprises one or more additional waveguide layers, each additional waveguide layer being bounded on at least one side by a TIR mirror, and wherein each additional waveguide layer has an index of refraction that is different from the index of refraction of other waveguide layers within the multilayer waveguide.

74. The system of claim 73, wherein the waveguide layers are arranged within the multilayer waveguide in order of index of refraction, with the waveguide layer with the highest index of refraction being disposed closest to the external surface of the optical touch pad and the waveguide layer with the lowest index of refraction being disposed furthest from the external surface.

75. The system of claim 56, wherein the external surface of the optical touch pad comprises scratch resistant properties.

76. The system of claim 56, wherein the external surface of the optical touch pad comprises hydrophobic properties.

77. The system of claim 56, wherein the external surface of the optical touch pad comprises anti-glare properties.

78. The system of claim 77, wherein a spotted low index of refraction anti-glare coating is applied to the external surface of the optical touch pad, compared to the first index of refraction.

79. The system of claim 56, further comprising a layer of air supported by structures that support the multilayer waveguide such that the layer of air is formed between the multilayer waveguide and an adjacent layer of the optical touch pad.

80. The system of claim 79, wherein the multilayer waveguide further comprises anti-reflective nano structures disposed in the layer of air.

81. The system of claim 56, wherein the first waveguide layer comprises a rigid layer that comprises the external surface of the optical touch pad and a pliable layer that is directly adjacent to the external layer, wherein the pliable layer and the external layer are substantially index of refraction matched, wherein the rigid layer is more rigid than the pliable layer and the pliable layer is more pliable than the rigid layer, wherein when an external force is applied to the external layer that deforms the external layer into the pliable layer, the pliable layer compresses without substantially stressing any other layers within the multilayer waveguide, and wherein the multilayer waveguide further comprises a layer comprising pockets of air, anti-reflective nano structures disposed in the layer comprising pockets of air, and an angle selective TIR mirror, the layer comprising pockets of air further comprising supporting structures that support the layers adjacent to the layer comprising pockets of air such that the pockets of air are formed between the adjacent layers.

82. The system of claim 81, wherein the second waveguide layer is disposed on a side of the first waveguide layer opposite from the external surface of the touch pad, the layer comprising pockets of air is disposed on a side of the second waveguide layer opposite from the first waveguide layer, and the angle selective TIR mirror is disposed on a side of the layer comprising pockets of air opposite from the second waveguide layer.

83. The system of claim 82, wherein the multilayer waveguide comprises a TIR mirror separator layer disposed between the second waveguide layer and the layer comprising pockets of air.

84. The system of claim 81, wherein the TIR mirror is mountable directly onto a display.

85. The system of claim 84, wherein the display comprises an electronic display.

86. The system of claim 84, wherein the display comprises a computer monitor or a television display.

87. The system of claim 84, wherein the display comprises a display of a mobile electronic device.

88. The system of claim 81, wherein the multilayer waveguide further comprises a TIR mirror separator layer that forms a surface of the multilayer waveguide opposite from the external surface of the optical touch pad, and wherein the mirror separator layer is mountable directly onto a display.

89. The system of claim 88, wherein the display comprises an electronic display.

90. The system of claim 88, wherein the display comprises a computer monitor or a television display.

91. The system of claim 88, wherein the display comprises a display of a mobile electronic device.

92. The system of claim 56, wherein a surface of the multilayer waveguide opposite from the external surface of the optical touch pad contacts a surface of a display such that a TIR mirror is formed between the surface of the multilayer waveguide and the surface of the display.

93. The system of claim 92, wherein the display comprises an electronic display.

94. The system of claim 92, wherein the display comprises a computer monitor or a television display.

95. The system of claim 92, wherein the display comprises a display of a mobile electronic device.

96. The system of claim 56, wherein the detector comprises a directional detector.

97. An optical touch pad system for determining a position of an object with respect to an external surface of the optical touch pad, comprising:
   a multilayer waveguide comprising:
      a first waveguide layer bounded on at least one side by a first TIR mirror surface of a first TIR mirror, the first waveguide layer having a first index of refraction;
      a second waveguide layer bounded on at least one side by a second TIR mirror surface of a second TIR mirror, the second waveguide having a second index of refraction;
      a first boundary layer having a first boundary index of refraction and being disposed on an opposite side of the multilayer waveguide from the external surface;
      a second boundary layer having a second boundary index of refraction;
      an underlayer having an underlayer index of refraction and being disposed between the first boundary layer and the second boundary layer;
      a plurality of deflecting structures having a structure index of refraction and being disposed within the underlayer;
      wherein the first and second boundary indices of refraction and the structure index of refraction are lower than the underlayer, and the first and second boundary layers, the underlayer, and the deflecting structures are designed such that the deflecting structures deflect electromagnetic radiation within the underlayer so that the deflected electromagnetic radiation is guided within the underlayer by total internal reflection to at least one detector to enable the detector to determine the position of the object with respect to the external surface; and
      at least one detector for receiving electromagnetic radiation from at least one layer of the multilayer waveguide and generating a signal relating to the position of the object with respect to the external surface of the optical touch pad;
   the multilayer waveguide positioned to: i) receive electromagnetic radiation having characteristics affected by the position of an object with respect to an external surface of the optical touch pad, wherein the characteristics of the electromagnetic radiation include one or both of propagation and/or intensity; and ii) direct the received electromagnetic radiation to the at least one detector by total internal reflection; and
   a processor that receives the at least one signal from the at least one detector and determines position information regarding the object.

98. The optical touch pad system of claim 97, wherein the optical touch pad system is mounted directly to a display layer that is an integral component of a display such that the display layer functions as the second boundary layer.

99. The optical touch pad system of claim 97, wherein the electromagnetic radiation guided within the underlayer by total internal reflection enables the detector to determine the position of the object with respect to the external surface when the object is hovering above the external surface of the optical touch pad.

100. A method for determining a position of an object with respect to a surface of an optical touch pad, the method comprising:
   transmitting electromagnetic radiation through the surface of the optical touch pad;
   receiving a portion of the electromagnetic radiation that is backscattered and/or reflected by the object into a multilayer waveguide, the multilayer waveguide comprising a first waveguide layer having a first index of refraction a second waveguide layer having a second index of refraction, and an underlayer having an underlayer index of refraction and being disposed between the first waveguide layer and the second waveguide layer, wherein a plurality of deflecting structures having a structure index of refraction are disposed within the underlayer, wherein the structure index of refraction is lower than the underlayer index of refraction;
   directing the received electromagnetic radiation to at least one detector by total internal reflection, wherein the first and second indices of refraction are lower than the underlayer index of refraction;

determining a position of the object with respect to the optical touch pad based on the electromagnetic radiation directed to the at least one detector by total internal reflection.

101. The method of claim 100, further comprising the step of determining an object type of the object based on characteristics of the electromagnetic radiation directed to the at least one detector.

102. An optical touch pad for determining a position of an object with respect to an external surface of the optical touch pad, the optical touch pad comprising:
a multilayer waveguide comprising:
a first boundary layer having a first boundary index of refraction;
a second boundary layer having a second boundary index of refraction;
an underlayer having an underlayer index of refraction and being disposed between the first boundary layer and the second boundary layer; and
a plurality of deflecting structures having a structure index of refraction that is lower than the underlayer index of refraction;
wherein the first and second boundary indices of refraction are lower than the underlayer index of refraction, and the deflecting structures are disposed within the underlayer and arranged to deflect electromagnetic radiation so that the deflected electromagnetic radiation is guided within the underlayer by total internal reflection to at least one detector to enable the detector to determine the position of the object with respect to the external surface.

103. The optical touch pad of claim 102, wherein the a multilayer waveguide further comprises:
a first waveguide layer bounded on at least one side by a first TIR mirror surface of a first TIR mirror, the first waveguide layer having a first index of refraction;
a second waveguide layer bounded on at least one side by a second TIR mirror surface of a second TIR mirror, the second waveguide having a second index of refraction; and
the multilayer waveguide being designed to direct electromagnetic radiation by total internal reflection to at least one detector to enable the detector to determine the position of the object with respect to the external surface.

104. The optical touch pad of claim 103, wherein the first index of refraction is higher than the second index of refraction.

105. The optical touch pad of claim 103, wherein the first index of refraction is higher than the second index of refraction, and wherein the second waveguide layer is on an opposite side of the first waveguide layer from the external surface of the optical touch pad.

106. The optical touch pad of claim 103, wherein the multilayer waveguide forms a plurality of TIR mirrors for segmenting angles of reflection of electromagnetic radiation received from an object in contact with the external surface.

107. The optical touch pad of claim 103, wherein the multilayer waveguide forms a plurality of TIR mirrors for segmenting angles of reflection of electromagnetic radiation received from an object in contact with or hovering above the external surface.

108. The optical touch pad of claim 103, wherein a surface of the first waveguide layer comprises the external surface of the optical touch pad.

109. The optical touch pad of claim 103, wherein the optical touch pad comprises at least one additional layer and the external surface of the optical touch pad comprises a surface of the additional layer.

110. The optical touch pad of claim 103, wherein the optical touch pad comprises at least one additional layer and the external surface of the optical touch pad comprises a surface of the additional layer; wherein the at least one additional layer comprises a soft layer near the external surface that is softer than the first waveguide layer and the second waveguide layer, and wherein the soft layer, in response to being touched by an object, is:
deformable to allow radiation otherwise trapped by TIR to illuminate the object, and
configured to receive backscattered light from the object that can be trapped by TIR in one or more of the waveguide layers.

111. The optical touch pad of claim 103, wherein the first waveguide layer comprises a rigid layer that comprises the external surface of the optical touch pad and a pliable layer that is directly adjacent to the external layer, wherein the rigid layer is more rigid than the pliable layer and the pliable layer is more pliable than the rigid layer, and wherein when an external force is applied to the external layer that deforms the external layer into the pliable layer, the pliable layer compresses without substantially stressing any other layers within the multilayer waveguide.

112. The optical touch pad of claim 103, wherein the first waveguide layer comprises a rigid layer that comprises the external surface of the optical touch pad, wherein the second waveguide layer comprises a pliable layer, wherein the rigid layer is more rigid than the pliable layer and the pliable layer is more pliable than the rigid layer, and wherein when an external force is applied to the first waveguide layer that deforms the first waveguide layer into the second waveguide layer, the second waveguide layer compresses without substantially straining any other layers within the multilayer waveguide.

113. The optical touch pad of claim 112, wherein the first index of refraction is greater than the second index of refraction.

114. The optical touch pad of claim 103, wherein the multilayer waveguide further comprises an underlayer bounded by TIR mirrors and a plurality of deflecting structures for deflecting electromagnetic radiation into and out of the underlayer.

115. The touch pad of claim 103, wherein the multilayer waveguide further comprises one or more additional waveguide layers, each additional waveguide layer being bounded on at least one side by a TIR mirror, and wherein each additional waveguide layer has an index of refraction that is different from the index of refraction of other waveguide layers within the multilayer waveguide.

116. The optical touch pad of claim 103, wherein the external surface of the optical touch pad comprises scratch resistant properties.

117. The optical touch pad of claim 103, wherein the external surface of the optical touch pad comprises hydrophobic properties.

118. The optical touch pad of claim 103, wherein the external surface of the optical touch pad comprises anti-glare properties.

119. The optical touch pad of claim 103, wherein a spotted low index of refraction anti-glare coating is applied to the external surface of the optical touch pad, compared to the first index of refraction.

120. The optical touch pad of claim 1, further comprising a layer of air supported by structures that support the multilayer waveguide such that the layer of air is formed between the multilayer waveguide and an adjacent layer of the optical touch pad.

121. The optical touch pad of claim 120, wherein the multilayer waveguide further comprises anti-reflective nano structures disposed in the layer of air.

122. The optical touch pad of claim 103, wherein a surface of the multilayer waveguide opposite from the external surface of the optical touch pad contacts a surface of a display such that a TIR mirror is formed between the surface of the multilayer waveguide and the surface of the display.

123. The optical touch pad of claim 122, wherein the display comprises an electronic display.

124. The optical touch pad of claim 122, wherein the display comprises a computer monitor or a television display.

125. The optical touch pad of claim 122, wherein the display comprises a display of a mobile electronic device.

126. The optical touch pad of claim 102, wherein the detector comprises a directional detector.

127. The optical touch pad of claim 102, wherein the touch pad is mounted directly to a display layer that is an integral component of a display such that the display layer functions as the second boundary layer.

128. The optical touch pad of claim 102, wherein the electromagnetic radiation guided within the underlayer by total internal reflection enables the detector to determine the position of the object with respect to the external surface when the object is hovering above the external surface of the optical touch pad.

\* \* \* \* \*